United States Patent
Kitaoka et al.

(10) Patent No.: US 6,465,122 B1
(45) Date of Patent: Oct. 15, 2002

(54) STORAGE BATTERY AND METHOD OF FABRICATING THE SAME

(75) Inventors: Kazuhiro Kitaoka; Shigeto Tamezane, both of Itano-gun; Takaaki Ikemachi, Tuna-gun, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/639,942

(22) Filed: Aug. 17, 2000

(30) Foreign Application Priority Data

Aug. 27, 1999 (JP) ............................................. 11-241001
Jun. 2, 2000 (JP) ........................................ 2000-165853

(51) Int. Cl.[7] .......................... H01M 2/12; H01M 2/30; H01M 10/04
(52) U.S. Cl. ......................... 429/54; 429/161; 429/178; 429/174; 29/623.2
(58) Field of Search ............................. 429/53, 54, 161, 429/211, 164, 174, 178; 29/623.2

(56) References Cited

U.S. PATENT DOCUMENTS

| | | | |
|---|---|---|---|
| 3,143,441 A | * 8/1964 | Coleman et al. | ............. 429/54 |
| 4,554,227 A | 11/1985 | Takagaki et al. | |
| 4,794,056 A | * 12/1988 | Pedecini et al. | ........ 429/211 X |
| 5,905,363 A | 5/1999 | Helbing et al. | ............. 320/131 |
| 5,912,089 A | 6/1999 | Kitano et al. | ................ 429/53 |
| 6,245,457 B1 | * 6/2001 | Romero | ...................... 429/161 |

FOREIGN PATENT DOCUMENTS

| | | |
|---|---|---|
| EP | 0 413 867 | 2/1991 |
| JP | 10-261397 | 9/1998 |
| JP | 10-302754 | 11/1998 |
| JP | 11-54105 | 2/1999 |

OTHER PUBLICATIONS

EPO Patent Abstracts of Japan; vol. 1999, No. 08, Jun. 30, 1999 & JP 11067264, Mar. 9, 1999.
EPO Patent Abstracts of Japan; vol. 1997, No. 09, Sep. 30, 1997 & JP 09134736, May 20, 1997.
EPO Patent Abstracts of Japan; vol. 012, No. 493 Dec. 22, 1988 & JP 63207059, Aug. 26, 1988.

* cited by examiner

*Primary Examiner*—Stephen Kalafut
(74) *Attorney, Agent, or Firm*—Nixon & Vanderhye P.C.

(57) ABSTRACT

An electrode body in which current collecting bodies are welded to upper and lower end surfaces of a spiral electrode group formed by interposing a separator between a positive electrode plate and a negative electrode plate is installed into a battery case. After the current collecting body is welded to the battery case, the cylindrical body is loaded on the diameter of the current collecting body, then the blade portions are welded, then the electrolytic solution is injected, and then a pair of electrodes are arranged on the port-sealing body and the battery case while bringing the bottom surface of the port-sealing body into contact with the peripheral side surface of the cylindrical body. After the contact portion between the port-sealing body and the peripheral side surface of the cylindrical body is welded by supplying the current in the discharge direction while applying pressure between the electrodes, the opening of the battery is sealed by caulking the opening edge of the battery case, and then the port-sealing body is pushed into the battery case by applying the force to the port-sealing body, whereby the storage battery is fabricated.

35 Claims, 18 Drawing Sheets

STORAGE BATTERY AND METHOD OF FABRICATING THE SAME

BACKGROUND OF THE INVENTION

1. Field of the Invention

The present invention relates to a storage battery which comprises a battery case used as one polarity terminal and having an opening, a port-sealing body used as other polarity terminal, for sealing the opening, and an electrode body installed into the battery case and having a current collecting body connected to at least one of end portions of positive/negative electrodes and a method of fabricating the same and, more particularly, an improvement of a current collecting structure of a lead portion for connecting the current collecting body connected to at least one of the positive/negative electrodes and the port-sealing body of a solution battery such as alkaline cell and lead cell and a welding method therefor.

2. Description of the Related Art

In general, the alkaline storage battery such as the nickel-hydrogen storage battery, the nickel-cadmium storage battery, or the like are constructed by interposing the separator between the positive electrode and the negative electrode, then winding them spirally, then connecting the current collecting body to the end portion of the positive electrode or the negative electrode to form the electrode body, then installing the electrode body into the metal battery case, then welding the lead portion extended from the current collecting body to the port-sealing body, and then fitting the port-sealing body to the opening portion of the battery case via the insulation gasket to seal tightly the battery case.

In case such alkaline storage battery is employed in the application such as the electric-powered tool, the electric vehicle, etc. in which charging/discharging operations are performed at a high rate, the electric resistance of the lead portion which connects the current collecting body and the port-sealing body affects largely the battery characteristic. Thus, if the electric resistance of the lead portion is large, there is such a problem that, when the discharge is performed by the large current, the voltage drop due to the electric resistance of the lead portion is caused to lower the battery voltage. Therefore, in Japanese Patent No. 2762599, it has been proposed to reduce the electric resistance of the lead portion by using plural sheets of current collecting parts to construct the lead portion or increasing the thickness of the current collecting parts.

Meanwhile, in case a plurality of current collecting parts constituting the lead portion are employed, such problems are caused that the welding to the port-sealing becomes difficult since not only the number of parts is increased but also the lead portion lacks the flexibility and that productivity is deteriorated since it becomes difficult to fold the lead portion when the port-sealing body is caulked to the opening portion of the battery case to seal. Also, in case the thickness of the current collecting parts constituting the lead portion is increased, such problems are caused that weldability to the port-sealing body is deteriorated since the reactive current is increased in the welding current for the resistance welding and that the productivity is deteriorated since it becomes difficult to fold the lead portion when the port-sealing body is caulked to the opening portion of the battery case to seal.

In contrast, in case the lead portion is welded to the port-sealing body, first the lead portion is resistance-welded to the port-sealing body while pushing the welding electrode against the side surface of the lead portion after the port-sealing body is positioned in the neighborhood of the lead portion that stands perpendicularly from the current collecting body. After this, the port-sealing body is fitted into the opening portion of the battery case by folding the lead portion and then the edge portion of the opening portion is caulked to seal tightly. Normally, if the lead portion that is thick and short is employed, its specific resistance can be reduced and thus the internal resistance of the battery can be lowered.

However, as described above, in order to fit the port-sealing body into the opening portion of the battery case after the lead portion is welded to the port-sealing body, the port-sealing body must be fitted into the opening portion of the battery case by using the longer lead portion so as to fold the lead portion at the time of sealing. Therefore, a length that exceeds at least a radius of the electrode body is needed as the length of the lead portion, and also the thin and long lead portion must be employed such that the lead portion can be folded. Thus, there is caused the problem that, since the specific resistance of the lead portion is increased, the internal resistance of the battery is increased.

Therefore, the connecting method of reducing the internal resistance of the battery by reducing the current collecting route has been proposed in unexamined Japanese Patent Publication (JP-A) 10-261397, for example. According to this method, the electrode body is installed into the battery case, then the opening portion of the battery case is sealed tightly by the port-sealing body in the situation that the lead portion welded to the current collecting body is brought into contact with the lower surface of the port-sealing body, and then the contact portion between the lead portion and the port-sealing body are welded by flowing current between the battery case and the port-sealing body.

Accordingly, it is possible to install easily the port-sealing body into the opening portion of the battery case if the lead portion is short, and it is possible to reduce the internal resistance of the battery by reducing the current collecting distance. Also, since there is no need to fold the lead portion in sealing the opening, it is possible to use the thick lead portion and also it is possible to reduce the internal resistance of the battery.

However, in the connecting method proposed in JP-A 10-261397, in case the height of the electrode body installed in the battery case is varied, the situation may occur wherein the contact portion between the port-sealing body and the lead portion cannot be surely formed. Thus, the problem arises that the welding portion cannot be firmly formed. Also, the strength and the quality of the welding spot after welding is deteriorated only by bringing the lead portion into contact with the port-sealing body, and in some cases yield of the product is degraded.

SUMMARY OF THE INVENTION

Therefore, the present invention has been made to overcome the above problems, and it is a first object of the present invention to obtain a storage battery which is excellent in high-rate discharge performance by using lead parts which can weld a port-sealing body and a current collecting body without fail even if its thickness is large and its length is small. Also, it is a second object of the present invention to provide a welding method capable of welding the lead portion and the port-sealing body or the lead portion and the current collecting body by using such lead parts to connect them without fail.

In order to achieve the above first object, the battery of the present invention the lead portion for connecting the port-sealing body and the current collecting body is constructed by the cylindrical body having the hollow portion, then this cylindrical body having the hollow portion is provided between the port-sealing body and the current collecting body, and then the port-sealing body and the current collecting body are welded to the lead portion formed of the cylindrical body.

If the port-sealing body and the current collecting body are welded to the lead portion having the hollow portion and formed of the cylindrical body, the current route in supplying the current is divided into two routes from the current collecting body to the port-sealing body (otherwise, from the port-sealing body to the current collecting body) along the peripheral side wall of the cylindrical body to flow the current. Hence, the current collecting distance of the lead portion becomes the semicircle of the cylindrical body and thus the voltage drop in the lead portion can be reduced by half. As a result, since there is no necessity to increase the thickness of the base material of the cylindrical body acting as the lead portion, the welding between the lead portion and the port-sealing body or the current collecting body is made easy and the operation for sealing the opening of the port-sealing body by caulking the opening portion of the battery case is made easy. Thus, the fabrication of the storage battery of this type becomes easy.

Further according to welding by flowing a large current. through electrolyte under high pressure, it is able to weld very easily, reliably and with high quality. And confirm and high connecting strength of welding portions can be obtained.

Also, in order to achieve the above second object,. the storage battery fabricating method of the present invention comprising the arranging step of arranging the port-sealing body in the opening portion of the battery case such that the current collecting body is brought into contact with the port-sealing body via a lead portion that connects electrically the current collecting body and the port-sealing body, and the welding step of welding the lead portion to any one of the port-sealing body and the current collecting body by flowing a current between the battery case and the port-sealing body while pressurizing the battery case and the port-sealing body.

At this time, in order to enhance the strength of the welded portion by the resistance welding, the current value of the welding current as well as the welding force applied to the welding spot are important factors. If the welding current is supplied to the welding spot, the metal of the contact portion is fused by Joule's heat at the welding spot to weld. In this case, if the welding spot is not pressurized, a phenomenon that the fused metal scatters occurs to thus generate so-called "weld dust". This is one of causes of short-circuit of the battery. Also, if the welding spot is not pressurized, the internal defect occurs at the welding spot to lower the weld strength.

However, in the welding method proposed in above JP-A 10-261397, since the welding is carried out after the opening portion of the battery case is tightly sealed by the port-sealing body, such port-sealing body is fixed. Thus, since the welding force cannot be applied to the welding spot in the welding, there is the problem that "weld dust" and the internal defect are caused.

However, in the present invention, the port-sealing body is arranged in the opening portion of the battery case so as to bring the port-sealing body into contact with the current collecting body via the lead portion, and then the welding current is supplied between the battery case and the port-sealing body. Therefore, it is possible to pressurize the contact portion in welding. Accordingly, the lead portion can be welded well to any one of the port-sealing body and the current collecting body without generation of the "weld dust". As a result, if the lead portion has a mere length to connect the port-sealing body and the current collecting body, such lead portion can be welded to the port-sealing body or the current collecting body.

Also, if the lead portion is constructed by the cylindrical body having the hollow portion, the current route in supplying the current is divided into two routes from the current collecting body to the port-sealing body (otherwise, from the port-sealing body to the current collecting body) along the peripheral side wall of the cylindrical body to flow the current. Therefore, the voltage drop in the lead portion can be reduced by half rather than the case where a sheet of lead plate is employed. For this reason, since there is no necessity to increase the thickness of the base material of the cylindrical body acting as the lead portion, the welding between the lead portion and the port-sealing body or the current collecting body is made easy and the operation for sealing the opening of the port-sealing body by caulking the opening portion of the battery case is made easy. Thus, the fabrication of the storage battery of this type becomes easy.

Further by having a structure that outer ends of the peripheral side surface of the lead portion are located inner than those of the bottom surface of the sealing body, a current path is divided into two paths from the port-sealing body to the current collecting body along a peripheral side surface of the cylindrical body, and current path can be shortened. Also, since the peripheral side surface of the cylindrical body can be welded previously to the current collecting body or the port-sealing body by providing the first welding step of welding previously the cylindrical body to the current collecting body or the first welding step of welding previously the cylindrical body to the port-sealing body, movement of the cylindrical body in the second welding step performed later can be prevented. Accordingly, it is ready to weld the cylindrical body to the port-sealing body or to weld the cylindrical body to the current collecting body in the second welding step.

In addition, if the peripheral side surface of the cylindrical body can be welded previously to the current collecting body or the port-sealing body, the welding current can be concentrated into the contact portion between the peripheral side surface of the cylindrical body and the port-sealing body or the contact portion between the peripheral side surface of the cylindrical body and the current collecting body in the second welding step performed later. As a result, the excellent welded portion can be formed and thus the welded portion having the excellent weld strength can be formed.

Then, if the current is supplied while pressurizing the port-sealing body and the battery case in the second welding step, it is possible to form the contact spot between the peripheral side surface of the cylindrical body and the port-sealing body or the current collecting body even if the height dimension of the electrode body is varied or the welding position of the cylindrical body welded previously to the current collecting body or the port-sealing body is varied.

By carrying a welding step while pressurizing the current collecting body and the lead portion, the current collecting body and the lead portion are associated with each other in an instant of melting, it is easy to weld the current collecting body and the lead portion. Further inner defect such as voids can be suppressed.

Accordingly, not only generation of "weld dust" acting as a cause to generate the internal short-circuit and generation of the internal defect to cause the reduction of the weld strength can be suppressed, but also the welded portion that has an excellent weld strength can be formed. Thus, the resistance value in the welding portion can be reduced. As a result, the storage battery in which no short-circuit is generated and the internal resistance is small can be obtained.

In this case, if the opening portion of the battery case is sealed tightly by the port-sealing body by supplying the current between the battery case and the port-sealing body while pressurizing the lead portion between the port-sealing body and the current collecting body after the welding step or the second welding step is carried out, generation of the "weld dust" can be suppressed without fail and also the welded portion that has no internal defect and has the excellent weld strength can be formed. Otherwise, if the welding step or the second welding step is carried out by not only pressurizing the lead portion between the port-sealing body and the current collecting body while crashing the annular groove formed on the upper portion of the battery case but also supplying the current between the battery case and the port-sealing body after the port-sealing portion is formed around the port-sealing body by sealing tightly the opening portion of the battery case by the port-sealing body, generation of the "weld dust" can be suppressed without fail and also the welded portion that has no internal defect and has the excellent weld strength can be formed.

Then, any shape may be employed as the cylindrical body constituting the lead portion if such shape enables to divide the current route into two routes in supplying the current and such shape is easily crashed by the pressurizing force in the sealing step. In this case, the cylindrical body having the sectional shape of the circular shape, the elliptic shape, or the polygonal shape is preferable because it can satisfy these conditions. Therefore, the sectional shape of the cylindrical body has a shape that is obtained by crashing the circular shape, the elliptic shape, or the polygonal shape by the pressurizing force in the sealing step.

Further, if the notched portions extending in the axial direction are provided on both edges of the cylindrical body, the cylindrical body is easily crashed by the pressurizing force in the sealing step along the notched portions. Also, if at least one of both edges of the cylindrical body is cut off obliquely, the welding electrode rod can be positioned perpendicularly to the exposed surface since a part of the inner peripheral surface of the cylindrical body on both ends is exposed by this cutting-off. Accordingly, the cylindrical body can be welded previously to the port-sealing body or the current collecting body by using a simple structure obtained by cutting off the end portions of the cylindrical body obliquely. Thus, since the current collecting distance is a semicircle distance from the welded spot on the current collecting body to the welded spot on the port-sealing body, such current collecting distance can be reduced.

Moreover, if the cylindrical body has flat plate blade portions extending from the peripheral side surface to both sides, to weld previously such cylindrical body to the port-sealing body or the current collecting body is made easy. Also, if the projection portions are provided to the lower surface of the port-sealing body or if the projection portions are provided to the peripheral side surface of the cylindrical body contacting to the upper surface of the port-sealing body, the welded portion having the larger weld strength can be formed since the current can be concentrated into the projection portions. Also, if the blade portions are formed by extending a part of the peripheral side wall of the cylindrical body, formation of the blade portions becomes easy.

Further according to providing projection portions on at least one of a lower surface of the electrode body and inner surface of the casing, by concentrating the current into the projection portions, the lower surface of the electrode body and inner surface of the casing can be welded each other very easily and confirmly, and connection with confirm and low resistance can be obtained.

DESCRIPTION OF THE PREFERRED EMBODIMENTS

Figure 1:
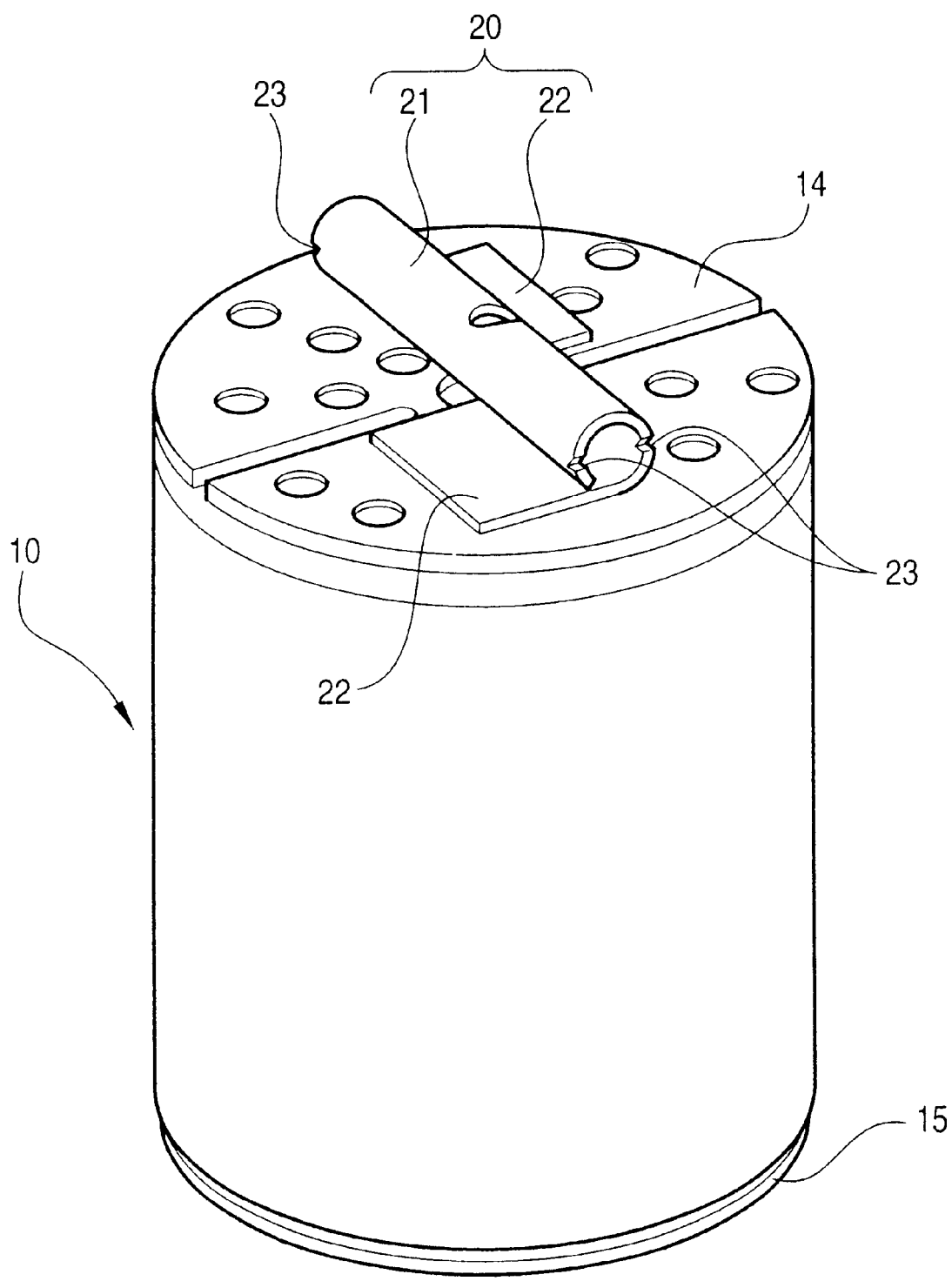
FIG. 1 is a perspective view showing the state that a cylindrical body constituting a lead portion of the present invention is welded to an electrode body.
Figure 2:
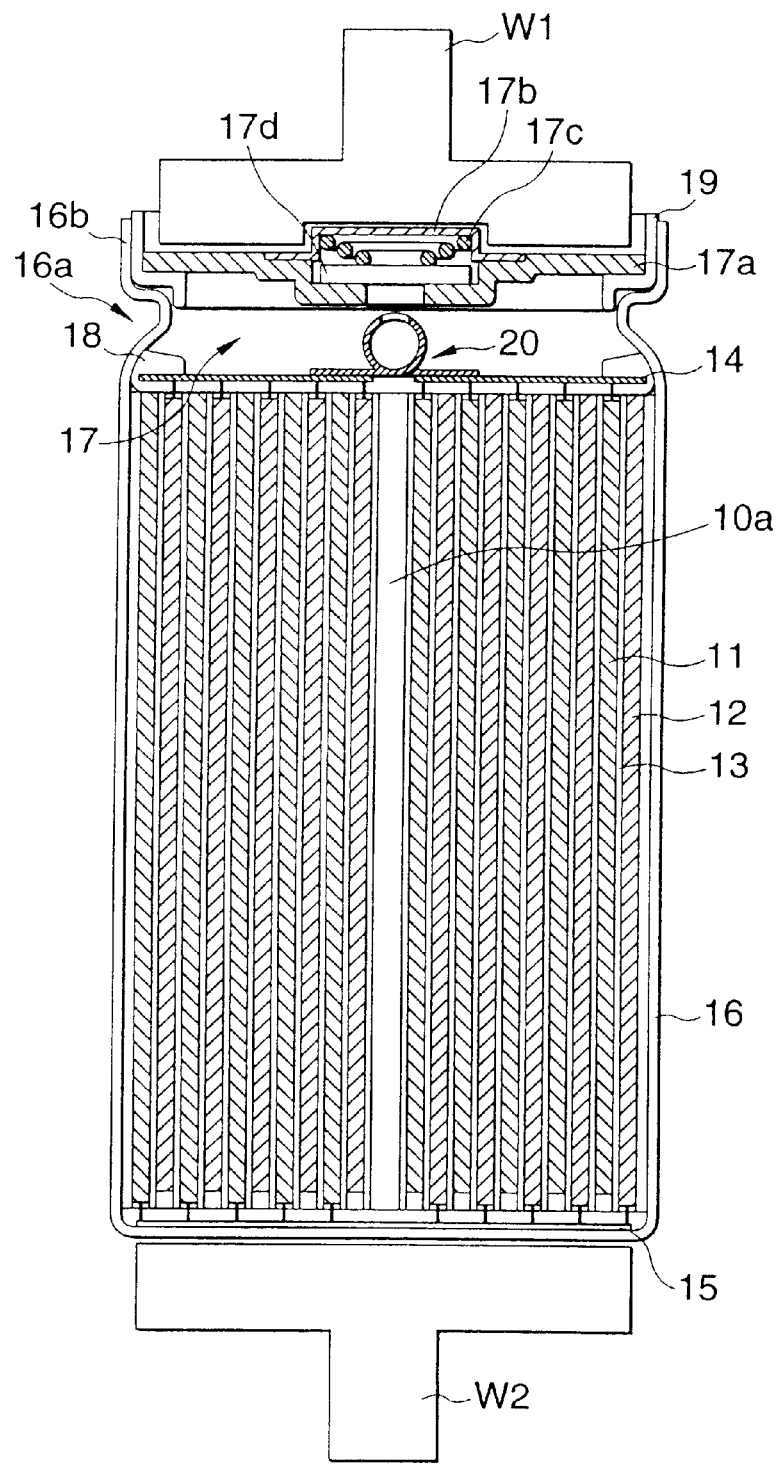
FIG. 2 is a sectional view showing the state that the cylindrical body constituting the lead portion in FIG. 1 is welded to a port-sealing body by inserting the electrode body into a battery case.
Figure 3:
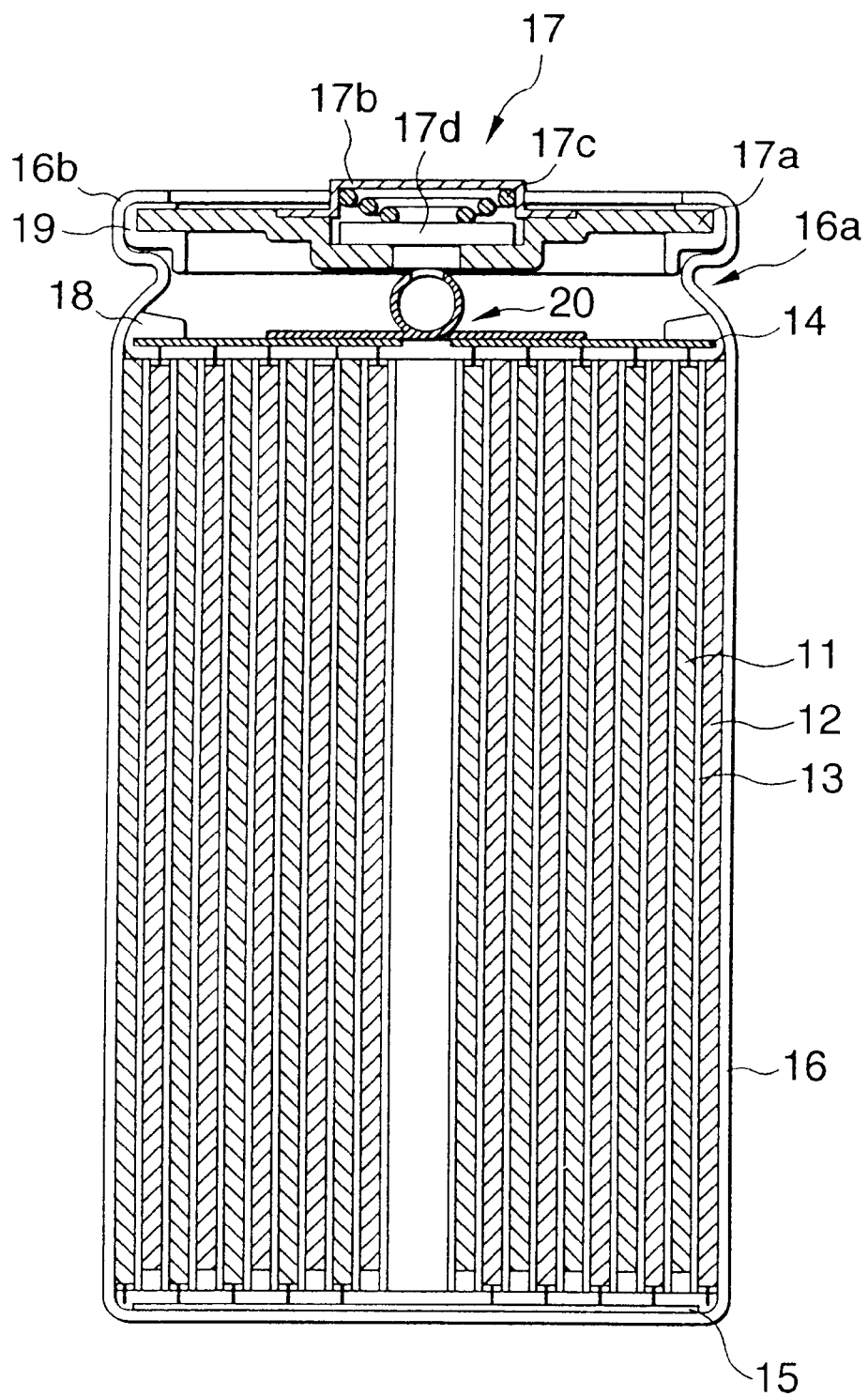
FIG. 3 is a sectional view showing the state that the port-sealing body is sealed onto an opening portion of a battery case.
Figure 4:
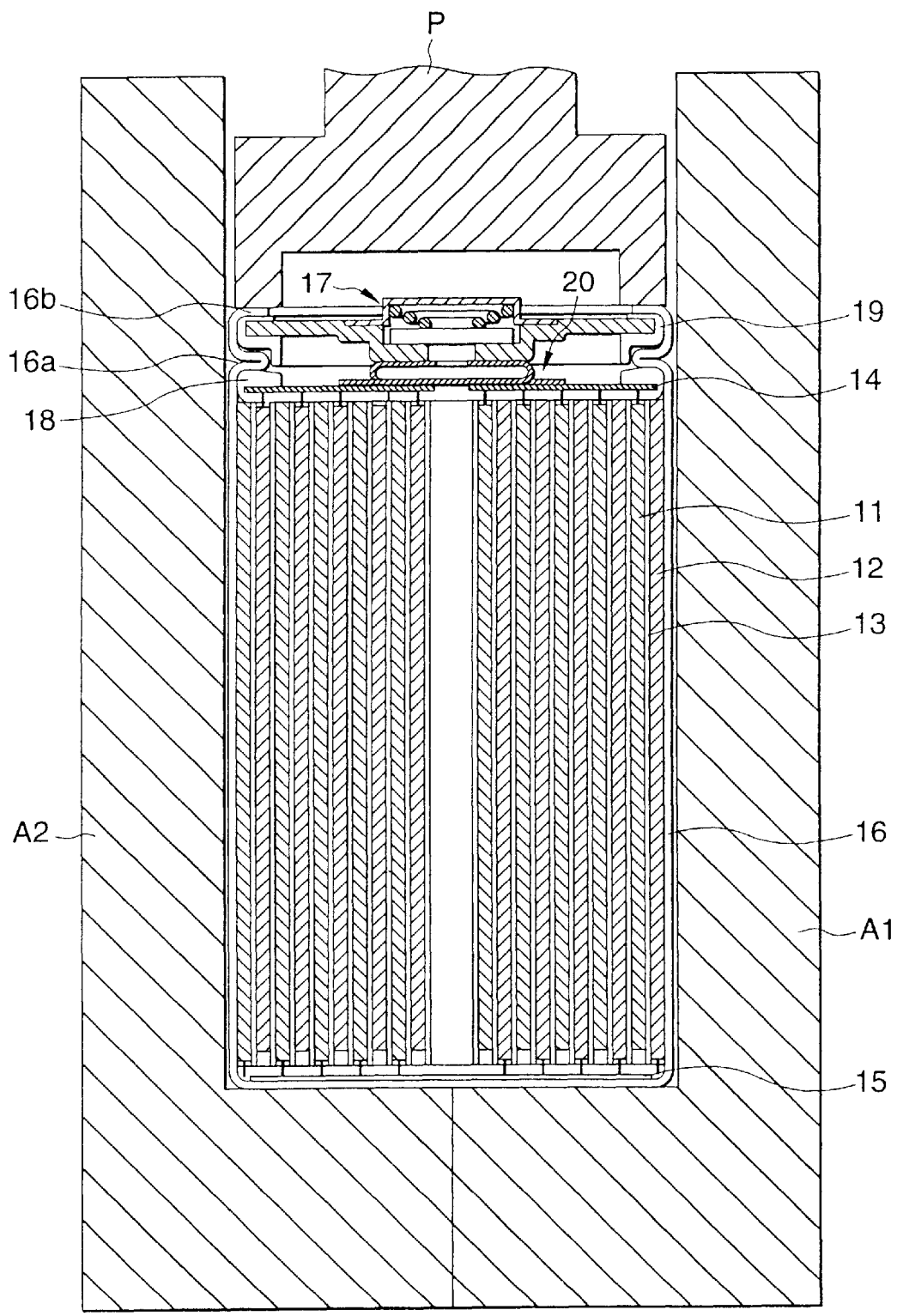
FIG. 4 is a sectional view showing the state that the port-sealing body is pressed.
Figure 5:
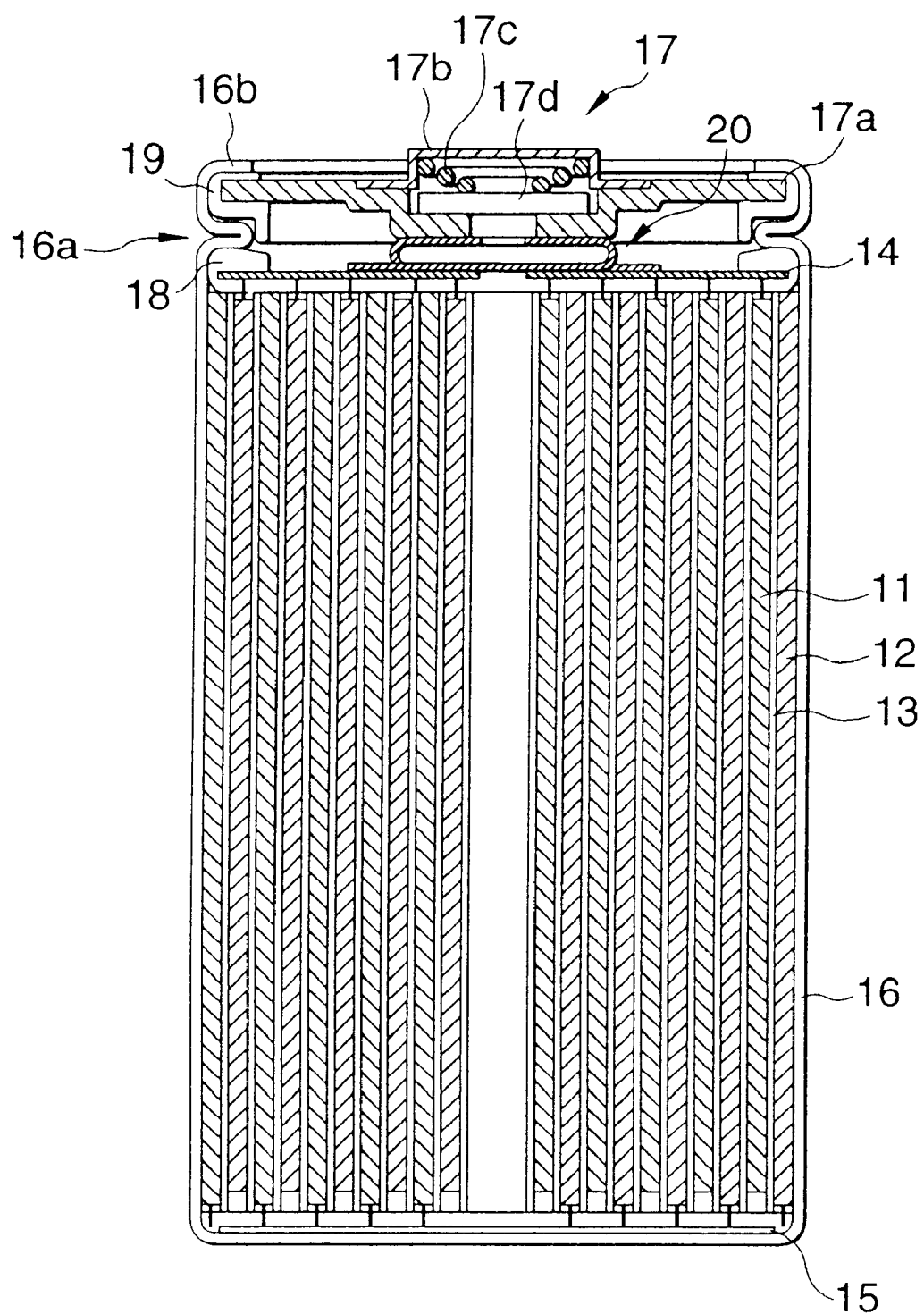
FIG. 5 is a sectional view showing a nickel-hydrogen storage battery that is completed by welding the electrode body, which is inserted into the battery case, to the port-sealing body via the cylindrical body constituting the lead portion.

Embodiments in which the present invention is applied to the nickel-hydrogen storage battery will be explained with reference to the drawings hereinafter. FIG. 1 is a perspective view showing the state that a cylindrical body constituting a lead portion of an embodiment 1 of the present invention is welded to an electrode body, and FIG. 2 is a sectional view showing the state that the cylindrical body constituting the lead portion in FIG. 1 is welded to a port-sealing body by inserting the electrode body into a battery case. Also, FIG. 3 is a sectional view showing the state that the port-sealing body is sealed onto an opening portion of a battery case, and FIG. 4 is a sectional view showing the state that the port-sealing body is pressed. Further, FIG. 5 is a sectional view showing a nickel-hydrogen storage battery that is completed by welding the electrode body, which is inserted into the battery case, to the port-sealing body via the cylindrical body constituting the lead portion.

1. Fabrication of Electrode Body

The nickel-hydrogen storage battery of the present embodiment includes a nickel positive electrode plate 11 and a hydrogen-storing alloy negative electrode plate 12. The nickel positive electrode plate 11 is fabricated by forming a nickel sintered porous body on a surface of an electrode plate core body made of a punching metal and then filling active material, which contains nickel hydroxide as a major component, into the nickel sintered porous body by virtue of the chemical impregnating method. In contrast, the hydrogen-storing alloy negative electrode plate 12 is fabricated by filling a paste-like negative electrode active material formed of the hydrogen-storing alloy on the surface of the electrode plate core body made of the punching metal, then drying them, and then rolling them up to a predetermined thickness.

A spiral electrode group is fabricated by interposing a separator 13 between the nickel positive electrode plate 11 and the hydrogen-storing alloy negative electrode plate 12 and then winding them spirally. An end portion of the punching metal as the electrode plate core body of the nickel positive electrode plate 11 is exposed from an upper end surface of the spiral electrode group. Also, an end portion of the punching metal as the electrode plate core body of the hydrogen-storing alloy negative electrode plate 12 is exposed from a lower end surface. Then, a spiral electrode body 10 is fabricated by welding a circular disc positive electrode current collecting body 14 having a number of openings to the positive electrode core body being exposed from an upper end surface of the spiral electrode group, and then welding a circular disc negative electrode current collecting body 15 having a number of openings to the negative electrode core body being exposed from the lower end surface.

2. Fabrication of Nickel-hydrogen Battery (1) Embodiment 1

Then, a cylindrical body 20 serving as a lead portion for connecting conductively the positive electrode current collecting body 14 and a port-sealing body 17 is prepared. The cylindrical body 20 consists of a cylindrical main body portion 21 and blade portions 22, 22 extending alternately from the main body portion 21 to both sides. A pair of notched portions 23, 23 extending in the axial direction are provided on both ends of the main body portion 21. The cylindrical body 20 is formed by cutting off rectangularly a pair of diagonal corner portions of a rectangular plate material (e.g., made of nickel having a thickness of 0.3 mm) and then folding it such that the center portion can be formed like a cylinder. Then, a height of the cylindrical body 20, i.e., a height from a bottom surface of the blade portion 22 to the upper end surface of the main body portion 21 is a length of a diameter (e.g., 5 mm) of the cylindrical body 20. A current collecting distance from a welded portion on a bottom surface of the port-sealing body 17 described later to a welded portion on an upper surface of the positive electrode current collecting body 14 is a length (e.g., 7.85 mm) of a semicircle of the cylindrical body 20.

Then, upon assembling the nickel-hydrogen storage battery, first the above electrode body 10 is installed into a battery case (an outer surface of a bottom acts as a negative electrode external terminal) 16 which is formed of nickel-plated iron to form a cylinder with a bottom, then a not-shown welding electrode is inserted in a space portion 10$a$ formed at a center portion of the electrode body 10, and then the negative electrode current collecting body 15 being welded to the hydrogen-storing alloy negative electrode plate 12 is spot-welded to an inner bottom surface of the battery case 16. Then, the main body portion 21 of the above cylindrical body 20 is loaded on the positive electrode current collecting body 14 such that the main body portion 21 is positioned on a diameter of the positive electrode current collecting body 14, and both blade portions 22, 22 are loaded on the positive electrode current collecting body 14. Then, both blade portions 22, 22 and the positive electrode current collecting body 14 are welded by the spot welding (first welding).

In this manner, both blade portions 22, 22 of the cylindrical body 20 and the positive electrode current collecting body 14 are welded. Then, as shown in FIG. 2, a vibrating isolating ring 18 is inserted into an upper inner peripheral side of the battery case 16, and then an annular groove is formed at the upper end portion of the vibrating isolating ring 18 by applying the grooving work to the outer peripheral side of the battery case 16. After an electrolytic solution formed of a 30 mass % potassium hydroxide (KOH) solution is injected into the battery case 16, the port-sealing body 17, on the periphery of which an insulation gasket 19 is fitted, is arranged on the opening portions of the battery case 16. In this case, the bottom surface of the port-sealing body 17 comes into contact with the peripheral side surface of the main body portion 21. The port-sealing body 17 includes a valve body that consists of a lid body 17$a$ on a bottom surface of which a circular downward projection portion is formed, a positive electrode cap (positive electrode external terminal) 17$b$, a spring 17$c$ interposed between the lid body 17$a$ and the positive electrode cap 17$b$, and a valve plate 17$d$. A vent hole is formed in the center of the lid body 17$a$.

After the port-sealing body is arranged as mentioned above, one welding electrode W1 is arranged on the upper surface of the positive electrode cap (positive electrode external terminal) 17$b$ and the other welding electrode W2 is arranged on the lower surface of the bottom surface (negative electrode external terminal) of the battery case 16. After this, while applying a pressure of $2 \times 10^6 \text{N/m}^2$ between a pair of these welding electrodes W1, W2, a current supplying process is applied by applying a voltage of 24 V between these welding electrodes W1, W2 in the discharge direction of the battery to flow a current of 3 KA for a time of about 15 msec. Therefore, the contact portion between the bottom surface of the port-sealing body 17 and the peripheral side surface of the main body portion 21 of the cylindrical portion 20 is welded (second welding) by the current supplying process, and thus the welded portion is formed.

Since the current supplying process is applied by applying the voltage between these welding electrodes W1, W2 while applying a pressure of $2 \times 10^6$ N/m² between a pair of welding electrodes W1, W2, it is possible to form a-contact spot between the peripheral side surface of the main body portion 21 of the cylindrical body 20 and the bottom surface of the port-sealing body 17 even if a height dimension of the electrode body 10 is varied or a welding position of the cylindrical body 20 being welded to the positive electrode current collecting body 14 is varied. Hence, not only generation of "weld dust" acting as a cause to generate the internal short-circuit can be suppressed, but also the welded portion that has no internal defect and has an excellent weld strength can be formed.

Figure 14A:
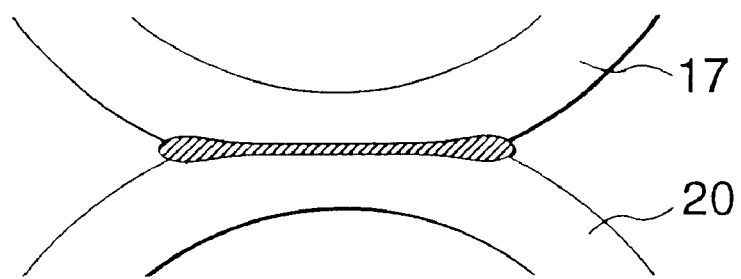
FIG. 14 is an explanation view showing a connection state in comparison between the present invention and a conventional example.
Figure 14B:
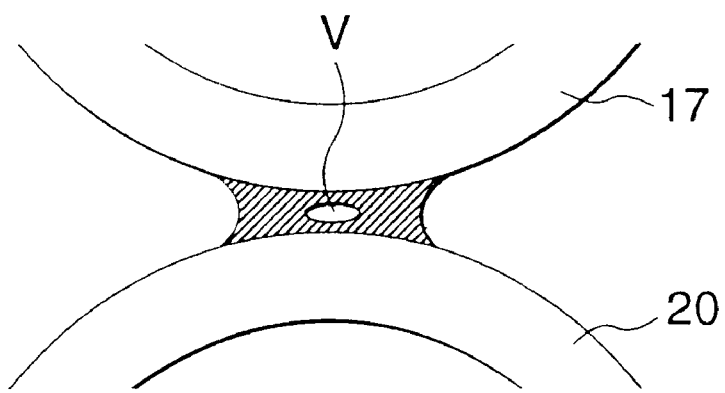

A weld state of the welded portion is shown by FIGS. 14A and 14B. According to a method of the present invention, since a welding step is carried while pressurizing the current collecting body and the lead portion, the current collecting body and the lead portion are associated with each other in an instant of melting, it is easy to weld the current collecting body and the lead portion. Further inner defect such as voids V shown in FIG. 14A can be suppressed. Contrary that, in the case of welding step without pressurizing the current collecting body and the lead portion, it is easy to generate voids V as shown in FIG. 14B.

Then, a port of the battery is sealed by caulking inwardly an opening edge 16b of the battery case 16, whereby a semi-complete battery is formed, as shown in FIG. 3. Then, as shown in FIG. 4, this semi-complete battery is arranged in a pair of split moulds A1, A2 and then a punch P connected to the press machine is arranged on the port-sealing body 17. Then, the punch P is pushed down by driving the press machine, and thus the port-sealing portion (the opening edge 16b of the battery case 16) of the port-sealing body 17 is pressurized by the punch P so as to push the port-sealing body 17 into the battery case 16.

Accordingly, the annular groove 16a is crushed, and then the lower end of the insulation gasket 19 can drop down close to the upper end portion of the vibration isolating ring 18. Therefore, as shown in FIG. 5, the cylindrical nickel-hydrogen storage battery having a nominal capacity of 6.5 Ah is fabricated. The main body portion 21 of the cylindrical body 20 is crushed by the pressurizing force generated by the punch P along a pair of notched portions 23, 23 formed on both edges along the axial direction, whereby the sectional shape becomes an elliptic shape being formed by crushing the circle. The nickel-hydrogen storage battery of the embodiment 1 fabricated in this way is identified as a battery A.

In order to form the as-mentioned welded portion, the current density of the contact portion between the bottom surface of the port-sealing body 17 and the peripheral side surface of the main body portion 21 of the cylindrical body 20 is by flowing the welding current between the positive electrode cap (positive electrode external terminal) 17b and the battery case 16, and thus the contact portion must be brought into the easily red-heated state by increasing generation of Joule's heat in the contact portion. Therefore, various embodiments described in the following may be considered.

(2) Embodiment 2

Figure 6:
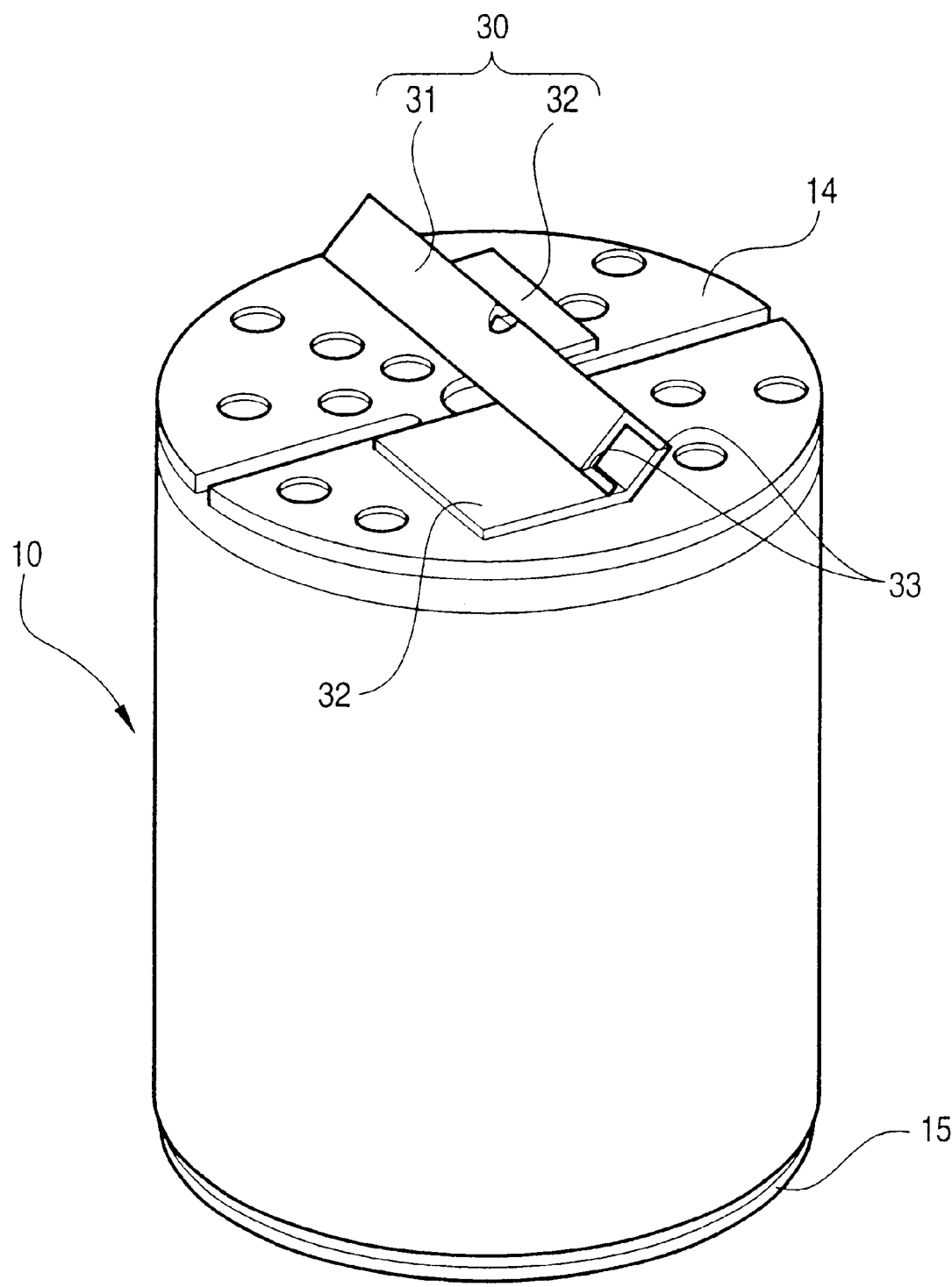
FIG. 6 is a perspective view showing the state that another cylindrical body constituting the lead portion of the present invention is welded to the electrode body.

FIG. 6 is a perspective view showing the state that a cylindrical body constituting the lead portion of an embodiment 2 is welded to the electrode body. The electrode body 10 employed in the embodiment 2 is similar to the embodiment 1. In the embodiment 2, there is a feature that a quadrangular cylindrical body 30 is employed.

The quadrangular cylindrical body 30 includes a main body portion 31 whose sectional shape is a quadrangular shape, and blade portions 32, 32 extending alternately from the main body portion 31 to both sides. The blade portions 32, 32 extend from one corner portion of the main body portion 31. The quadrangular cylindrical body 30 is formed by cutting off rectangularly a pair of diagonal corner portions of a rectangular plate material (e.g., made of nickel having a thickness of 0.3 mm) and then folding it such that the center portion can be formed like a quadrangular cylinder. Then, a height of the quadrangular cylindrical body 30, i.e., a height from a bottom surface of the blade portion 32 to the upper end surface of the main body portion 31 is a length of a diagonal (e.g., 5 mm) of the quadrangular cylindrical body 30. The current collecting distance from the welded portion on the bottom surface of the port-sealing body 17 described later to the welded portion on the upper surface of the positive electrode current collecting body 14 is a length (e.g., 7.09 mm) of a semi-circumference of the quadrangular cylindrical body 30.

Then, the main body portion 31 of the cylindrical body 30 is loaded on the positive electrode current collecting body 14 such that the main body portion 31 is positioned on the diameter of the positive electrode current collecting body 14, and both blade portions 32, 32 are loaded on the positive electrode current collecting body 14. Then, both blade portions 32, 32 and the positive electrode current collecting body 14 are welded by the spot welding (first welding). After this, like the above first embodiment 1, the cylindrical nickel-hydrogen storage battery having the nominal capacity of 6.5 Ah is fabricated by welding (second welding) the bottom surface of the port-sealing body 17 and the side edge of the main body portion 31 of the cylindrical body 30, and then sealing the port and pressurizing by using the punch P. The main body portion 31 whose sectional shape is the quadrangular shape is crushed into the almost elliptic sectional shape. The nickel-hydrogen storage battery of the embodiment 2 fabricated in this way is identified as a battery B.

Since the main body portion 31 in the embodiment 2 has the quadrangular sectional shape and the blade portions 32, 32 extend from one corner portion, a side of the corner portion corresponding to this one corner portion comes into contact with the bottom portion of the port-sealing body 17. Therefore, since a pair of other corner portions 33, 33 are arranged in the center of the cylindrical body 30, the corner portions 33, 33 can be crashed along sides of the corner portions 33, 33 at the time of pressurization, without provision of the notched portion in the above embodiment 1.

(3) Embodiment 3

Figure 7:
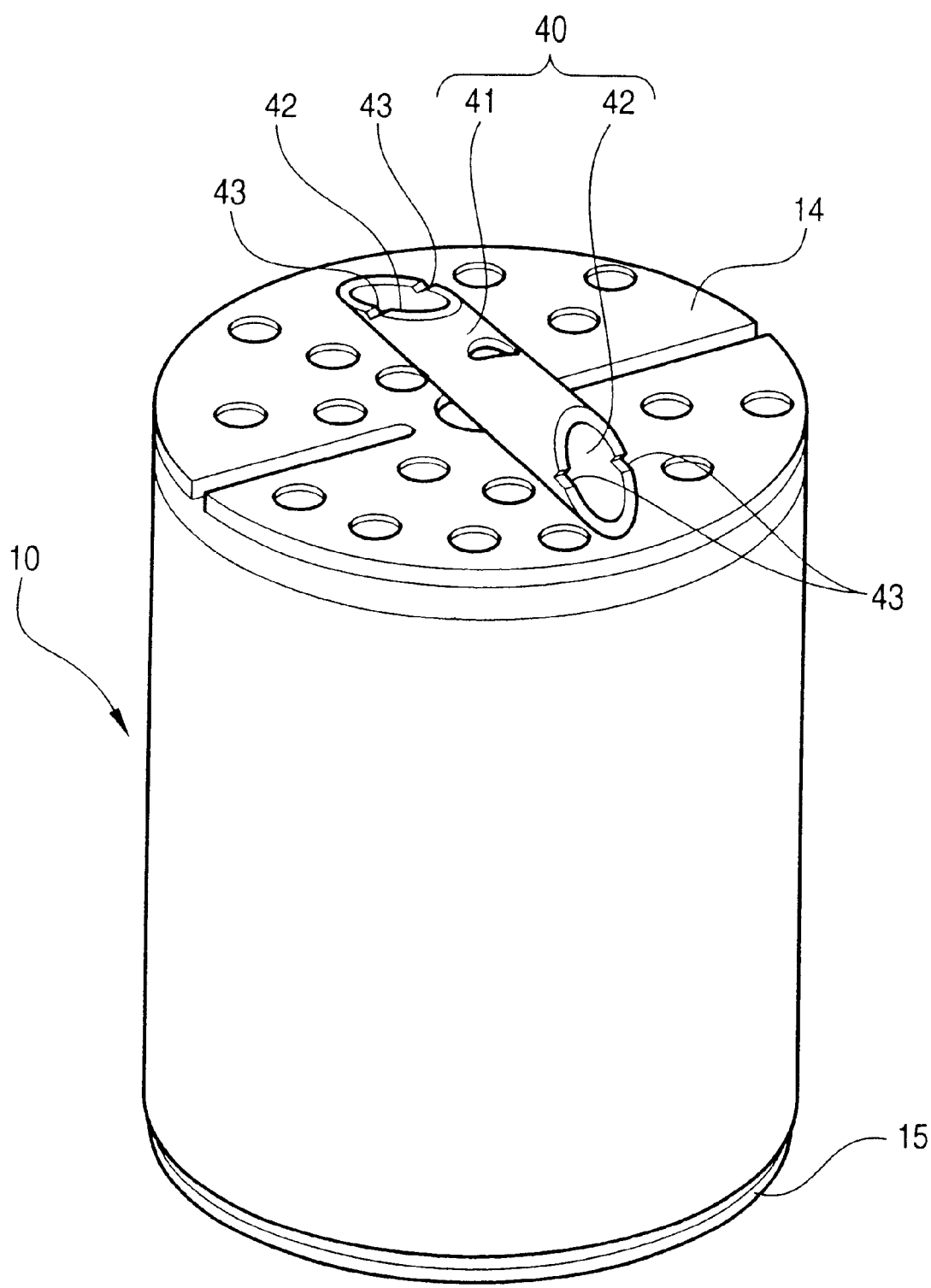
FIG. 7 is a perspective view showing the state that still another cylindrical body constituting the lead portion of the present invention is welded to the electrode body.

FIG. 7 is a perspective view showing the state that a cylindrical body constituting a lead portion of an embodiment 3 is welded to the electrode body. The electrode body 10 employed in the embodiment 3 is similar to the embodiment 1. In the embodiment 3, there is a feature that a cylindrical body 40 whose both ends are cut obliquely is employed.

The cylindrical body 40 includes a circular cylindrical main body portion 41 whose both end portions are cut obliquely. A pair of notched portions 43, 43 extending along the axial direction are provided to both obliquely-cut edges 42, 42 of the main body portion 41. Then, the cylindrical body 40 is formed by using a circular cylindrical pipe (e.g., made of nickel having a thickness of 0.3 mm) and cutting off both ends portions of the pipe obliquely. Then, a height of the cylindrical body 40 is a length of a diameter of the main body portion 41. The current collecting distance from the welded portion on the bottom surface of the port-sealing body 17 to the welded portion on the upper surface of the positive electrode current collecting body 14 is a length (e.g., 7.85 mm) of a semicircle of the cylindrical body 40.

Then, the main body portion 41 of the cylindrical body 40 is loaded on the positive electrode current collecting body 14 such that the main body portion 41 is positioned on the diameter of the positive electrode current collecting body 14. The main body portion 41 is welded to the positive electrode current collecting body 14 by the spot welding (first welding) while setting the welding electrode rod perpendicular to the inner peripheral surface exposed from both edges 42, 42 of the cylindrical body 40. After this, like the above first embodiment 1, the cylindrical nickel-hydrogen storage battery having the nominal capacity of 6.5 Ah is fabricated by welding (second welding) the bottom surface of the port-sealing body 17 and the peripheral side edge of the main body portion 41 of the cylindrical body 40, and then sealing the port and pressurizing by using the punch P. The main body portion 41 is crushed into the almost elliptic sectional shape. The nickel-hydrogen storage battery of the embodiment 3 fabricated in this way is identified as a battery C.

(4) Embodiment 4

Figure 8:
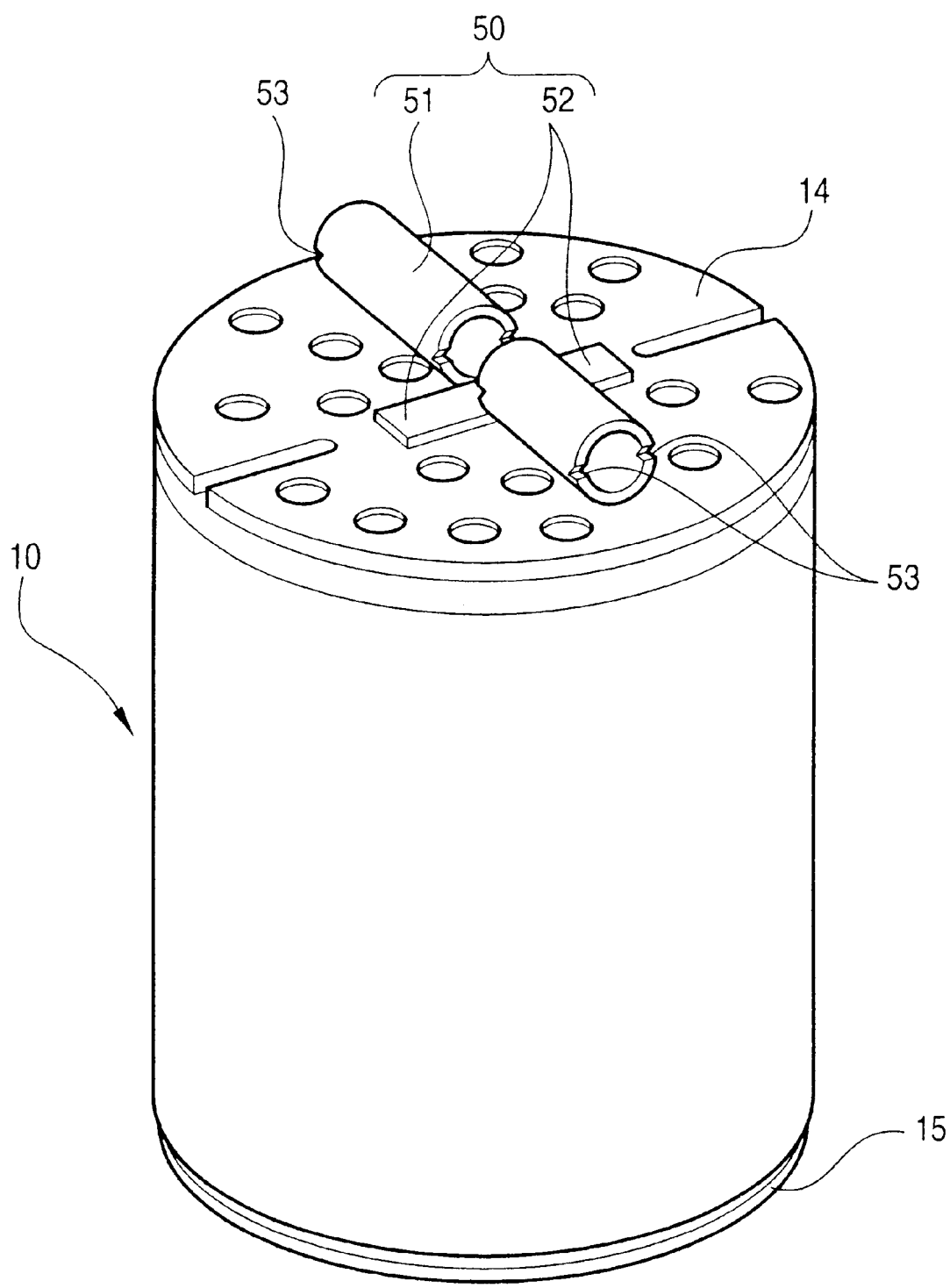
FIG. 8 is a perspective view showing the state that yet still another cylindrical body constituting the lead portion of the present invention is welded to the electrode body.

FIG. 8 is a perspective view showing the state that a cylindrical body constituting a lead portion of an embodiment 4 is welded to the electrode body. The electrode body 10 employed in the embodiment 4 is similar to the embodiment 1. In the embodiment 4, there is a feature that a circular cylindrical body 50 is employed.

The cylindrical body 50 includes a circular cylindrical main body portion 51 a part of the peripheral wall of which in the center portion is unfolded so as to form a clearance, and blade portions 52, 52 which are unfolded in the center portion of the main body portion 51. Then, the cylindrical body 50 is formed by using a circular cylindrical pipe (e.g., made of nickel having a thickness of 0.3 mm) and unfolding a part of the peripheral wall in the center portion. Then, a height of the cylindrical body 50, i.e., a height from the bottom surface of the blade portion 52 to the upper end surface of the main body portion 51 is a length of a diameter (e.g., 5 mm) of the cylindrical body 50. The current collecting distance from the welded portion on the bottom surface of the. port-sealing body 17 to the welded portion on the upper surface of the positive electrode current collecting body 14 is a length (e.g., 7.85 mm) of a semicircle of the cylindrical body 50.

Then, the main body portion 51 of the cylindrical body 50 is loaded on the positive electrode current collecting body 14 such that the main body portion 51 is positioned on the diameter of the positive electrode current collecting body 14. The blade portions 52, 52 of the main body portion 51 are welded to the positive electrode current collecting body 14 by the spot welding (first welding). After this, like the above first embodiment 1, the cylindrical nickel-hydrogen storage battery having the nominal capacity of 6.5 Ah is fabricated by welding (second welding) the bottom surface of the port-sealing body 17 and the peripheral side surface of the main body portion 51 of the cylindrical body 50, and then sealing the port and pressurizing by using the punch P. The main body portion 51 is crushed into the almost elliptic sectional shape by the pressurizing force by the punch P. The nickel-hydrogen storage battery of the embodiment 4 fabricated in this way is identified as a battery D.

(5) Embodiment 5

Figure 9:
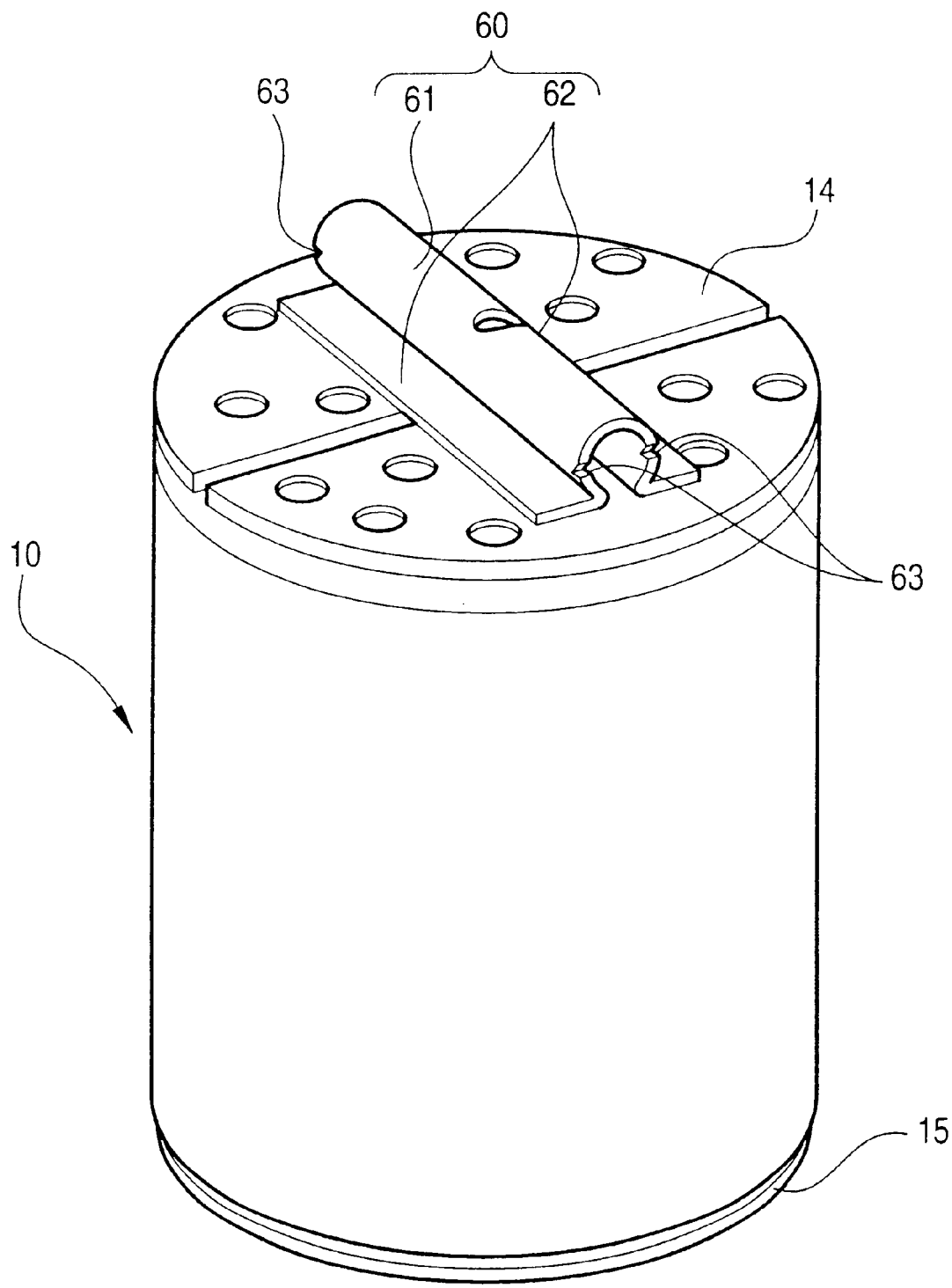
FIG. 9 is a perspective view showing a further cylindrical body constituting the lead portion of the present invention is welded to the electrode body.

FIG. 9 is a perspective view showing the state that a cylindrical body constituting a lead portion of an embodiment 5 is welded to the electrode body. The electrode body 10 employed in the embodiment 5 is similar to the embodiment 1. A cylindrical body 60 of the embodiment 5 includes a main body portion 61 whose center portion is formed like a circular cylinder, and blade portions 62, 62 which extend to both sides of the bottom portion of the main body portion 61. A pair of notched portions 63, 63 extending in the axial direction are provided on both edges of the main body portion 61. The cylindrical body 60 uses a rectangular plate member (e.g. made of nickel having a thickness of 0.3 mm), and the blade portions 62, 62 extending to both side of the bottom side are formed by folding the center portion like the circular cylinder. Then, a height of the cylindrical body 60, i.e., a height from the bottom surface of the blade portion 62 to the upper end surface of the main body portion 61 is a length of a diameter (e.g., 5 mm) of the cylindrical body 60. The current collecting distance from the welded portion on the bottom surface of the port-sealing body 17 to the welded portion on the upper surface of the positive electrode current collecting body 14 is a length (e.g., 7.85 mm) of a semicircle of the cylindrical body 60.

Then, the main body portion 61 of the cylindrical body 60 is loaded on the positive electrode current collecting body 14 such that the main body portion 61 is positioned on the diameter of the positive electrode current collecting body 14. The blade portions 62, 62 are welded to the positive electrode current collecting body 14 by the spot welding (first welding). After this, like the above first embodiment 1, the cylindrical nickel-hydrogen storage battery having the nominal capacity of 6.5 Ah is fabricated by welding (second welding) the bottom surface of the port-sealing body 17 and the peripheral side surface of the main body portion 61 of the cylindrical body 60, and then sealing the port and pressurizing by using the punch P. The main body portion 61 is crushed into the almost elliptic sectional shape by the pressurizing force by the punch P. The nickel-hydrogen storage battery of the embodiment 5 fabricated in this way is identified as a battery E.

(6) Embodiment 6

Figure 10:
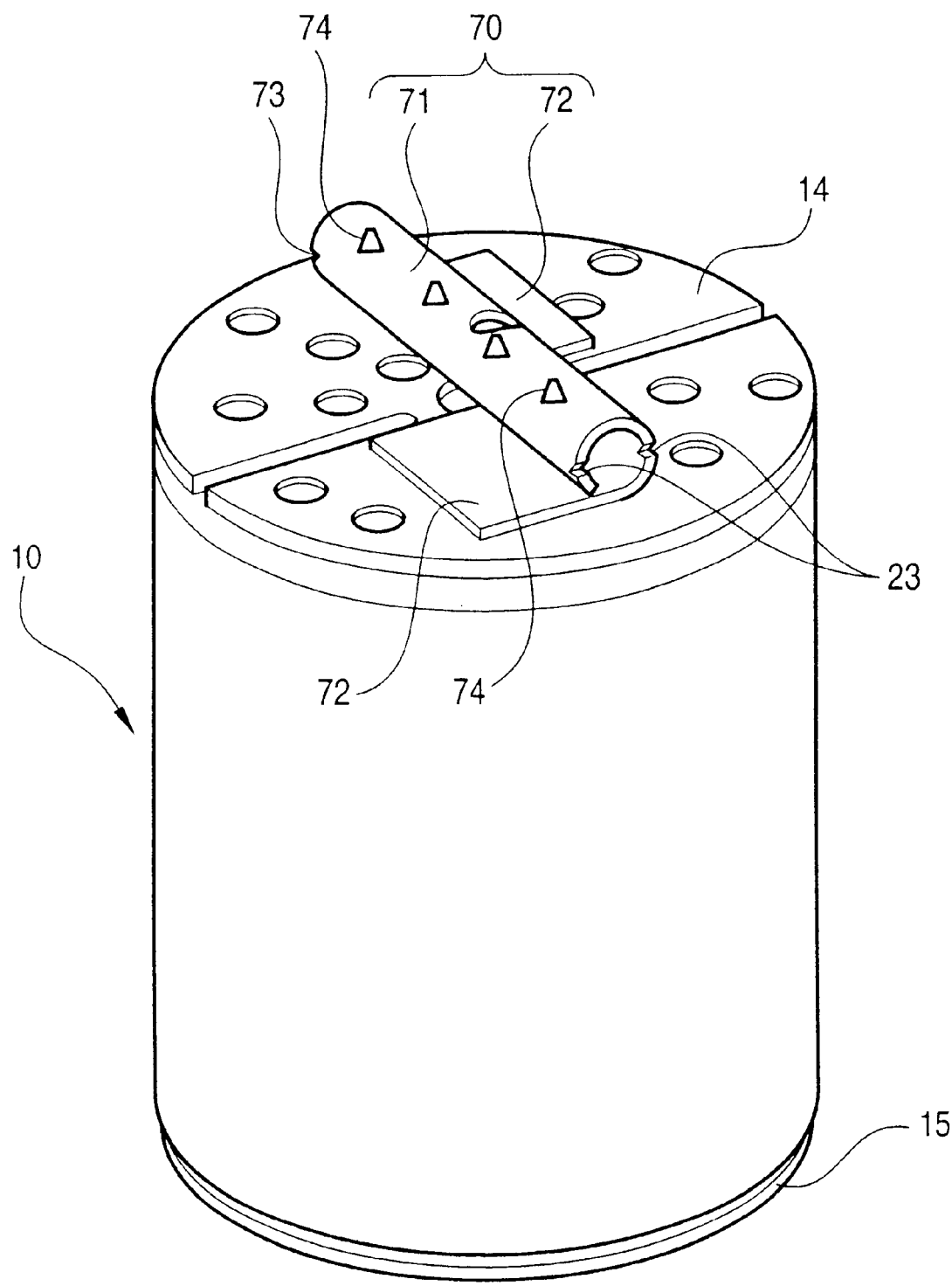
FIG. 10 is a perspective view showing a still further cylindrical body constituting the lead portion of the present invention is welded to the electrode body.

FIG. 10 is a perspective view showing the state that a cylindrical body constituting a lead portion of an embodiment 6 is welded to the electrode body. The electrode body 10 employed in the embodiment 6 is similar to the embodiment 1. A cylindrical body 70 of the embodiment 6 includes a circular cylinder main body portion 71, and blade portions 72, 72 which extend alternately from the main body portion 71 to both sides. A pair of notched portions 73, 73 extending in the axial direction are provided on both edges of the main body portion 71. Four projection portions 74 are provided on the peripheral side surface of the main body portion 71.

The cylindrical body 70 uses a rectangular plate member (e.g., made of nickel having a thickness of 0.3 mm) a pair of diagonal corner portions of which are cut off rectangularly. Four projection portions 74 are provided on a straight line. in the center along the short side at an equal distance, and then the cylindrical body 70 is formed by folding the plate member along the straight line, on which four projection portions 74 are formed at the equal distance, so as to form a circular cylinder. Then, a height of the cylindrical body 70, i.e., a height from the bottom surface of the blade portion 72 to the upper end surface of the main body portion 71 is a length of a diameter (e.g., 5 mm) of the cylindrical body 70. The current collecting distance from the welded portion on the bottom surface of the port-sealing body 17 to the welded portion on the upper surface of the positive electrode current collecting body 14 is a length (e.g., 7.85 mm) of a semicircle of the cylindrical body 70.

Figure 11:
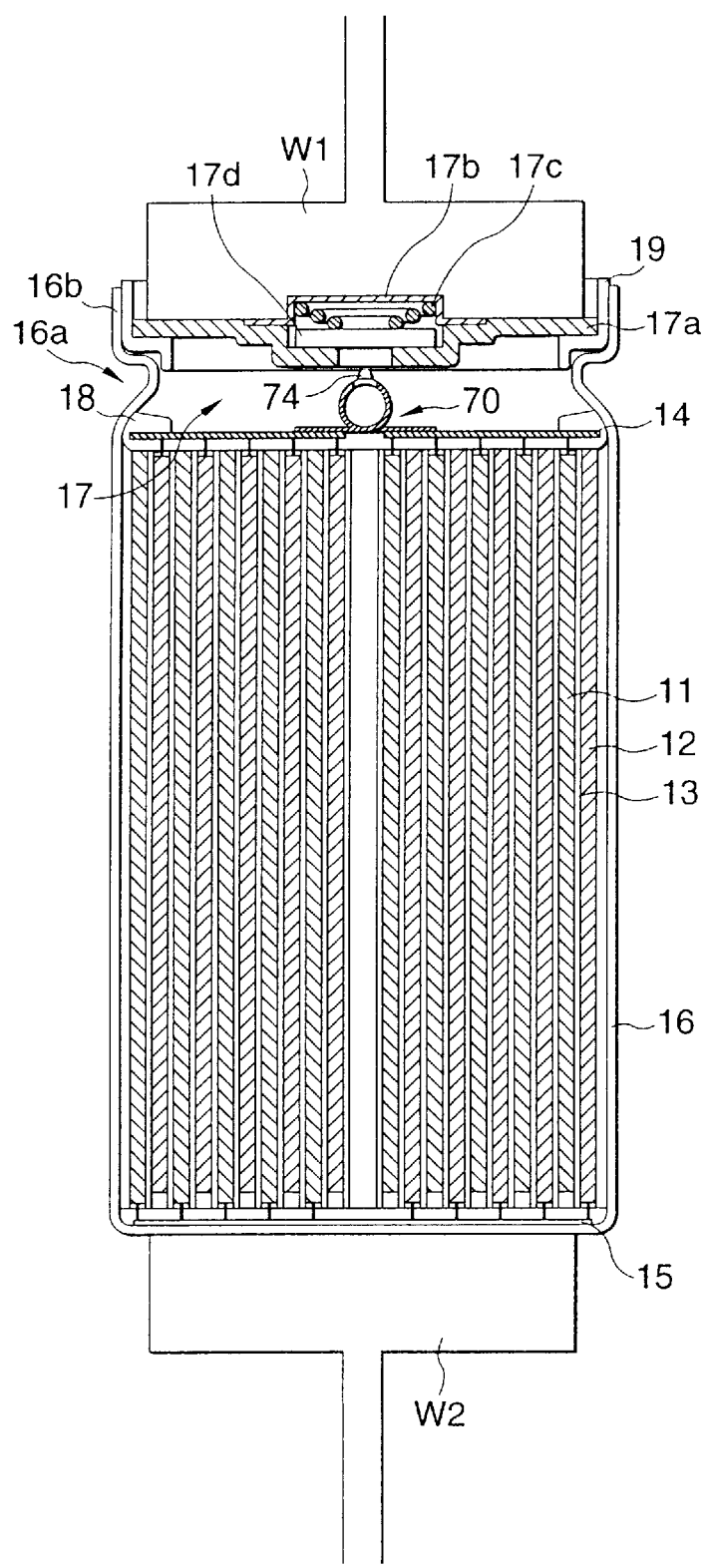
FIG. 11 is a sectional view showing the state that the cylindrical body constituting the lead portion in FIG. 8 is welded to the port-sealing body by inserting the electrode body into the battery case.

Then, the main body portion 71 of the cylindrical body 70 is loaded on the positive electrode current collecting body 14 such that the main body portion 71 is positioned on the diameter of the positive electrode current collecting body 14. The blade portions 72, 72 are welded to the positive electrode current collecting body 14 by the spot welding (first welding). After this, as shown in FIG. 11, like the above first embodiment 1, the cylindrical nickel-hydrogen storage battery having the nominal capacity of 6.5 Ah is fabricated by welding (second welding) contact portions between the bottom surface of the port-sealing body 17 and the projection portions 74 of the main body portion 71 of the cylindrical body 70, and then sealing the port and pressurizing by using the punch P. At this time, sine the current is concentrated to the projection portions 74 in the second welding, the welded portion having the larger weld strength can be formed. The main body portion 71 is crushed into the almost elliptic sectional shape by the pressurizing force by the punch P. The nickel-hydrogen storage battery of the embodiment 6 fabricated in this way is identified as a battery F.

(7) Embodiment 7

Figure 12:
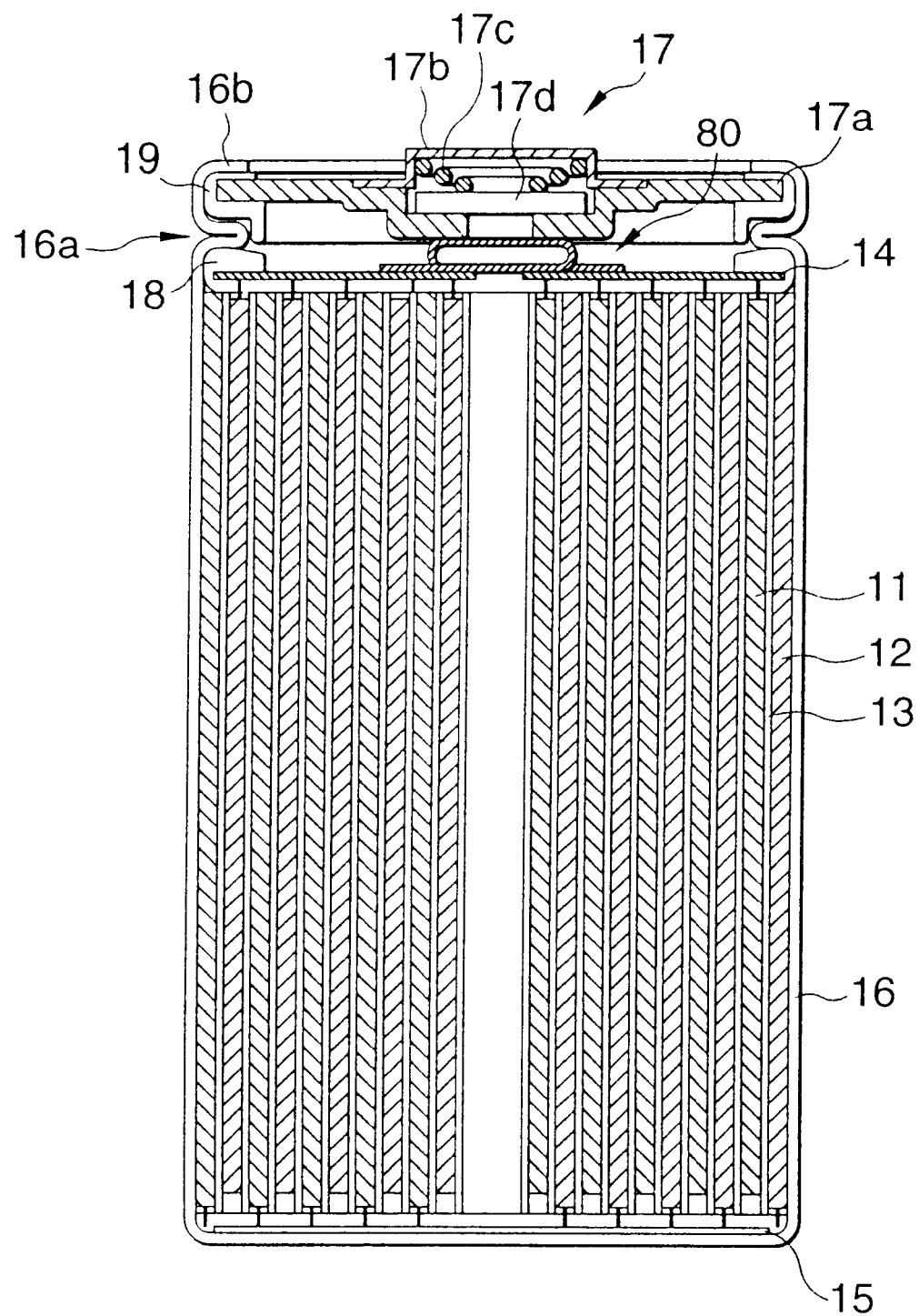
FIG. 12 is a perspective view showing another embodiment of the present invention.

FIG. 12 is a perspective view showing the state that a cylindrical body constituting a lead portion of an embodiment 7 is welded to the electrode body. The electrode body 10 employed in the embodiment 7 is similar to the embodiment 1. A cylindrical body 80 of the embodiment 7 has a structure that outer ends of the peripheral side surface of the lead portion are located inside those of the bottom surface of the sealing body. Therefore a current path is divided into two paths from the port-sealing body to the current collecting body along a peripheral side surface of the cylindrical body, and the current path can be shortened.

(8) Embodiment 8

Figure 13:
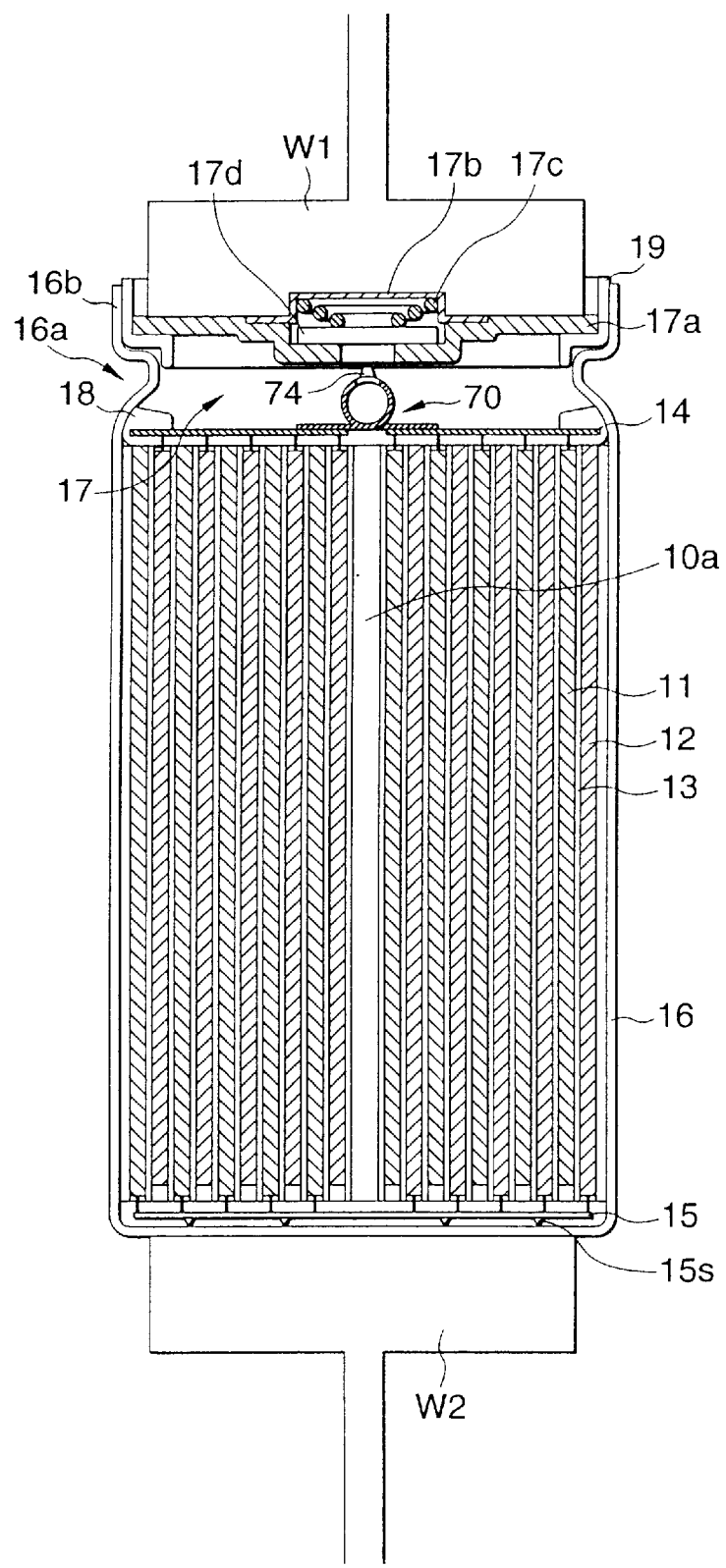
FIG. 13 is a perspective view showing another embodiment of the present invention.

FIG. 13 is a perspective view showing the state that a cylindrical body constituting a lead portion of an embodiment 8 is welded to the electrode body. The electrode body 10 employed in the embodiment 8 is similar to the embodiment 1. Since projection portions 15S are provided to a negative electrode current collecting body 15, by supplying current, casing 16 and negative electrode current collecting body 15 can be welded each other easily and confirmly at the same time as welding of sealing body 17*a* and lead portion 70. The projecting portions can be formed on the battery case 16.

(9) Comparative Example

Figure 15:
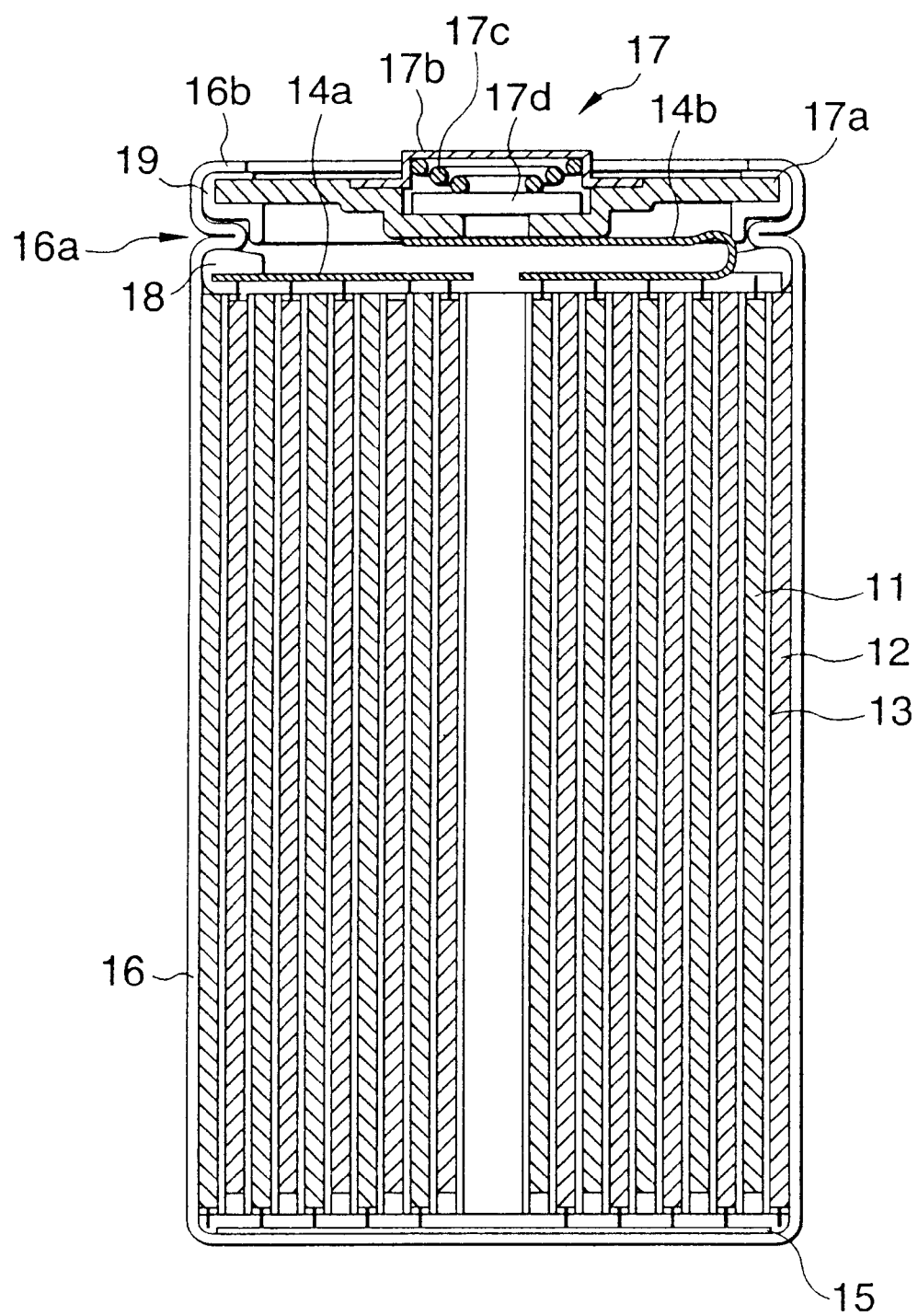
FIG. 15 is a sectional view showing a storage battery in the prior art (comparative example), and showing the state that the lead portion is welded to the port-sealing body.

As shown in FIG. 15 a circular disc positive electrode current collecting body 14*a* which has a number of openings and from a part of which a lead portion 14*b* is extended is welded to the positive electrode core body being exposed from the upper end surface of the spiral electrode group fabricated similarly to the above embodiment 1. In contrast, the circular disc negative electrode current collecting body 15 having a number of openings is welded to the negative electrode core body being exposed from the lower end surface of the spiral electrode group, whereby a spiral electrode body is fabricated. The electrode body is installed into the battery case 16, and then the negative electrode current collecting body 15 is spot-welded to the inner bottom surface of the battery case 16. Then, the vibrating isolating ring 18 is inserted into the upper inner peripheral side of the battery case 16, and then an annular groove 16*a* is formed at the upper end portion of the vibrating isolating ring 18 by applying the grooving work to the outer peripheral side of the battery case 16.

Next, a lead portion 14*b* extended from the positive electrode current collecting body 14*a* is perpendicularly folded, and then an end portion of the lead portion 14*b* is resistance-welded to the bottom surface of the port-sealing body 17. Then, after an electrolytic solution formed of the 30 mass % potassium hydroxide (KOH) solution is injected into the battery case 16, the port-sealing body 17, on the periphery of which the insulation gasket 19 is fitted, is arranged on the opening portions of the battery case 16 by folding the lead portion 14*b*. Then, the cylindrical nickel-hydrogen storage battery having the nominal capacity of 6.5 Ah is fabricated by caulking an edge 16*b* of the opening of the battery case 16 inwardly to seal the port of the battery. The nickel-hydrogen storage battery of the comparative example fabricated in this way is identified as a battery X.

3. Battery Characteristic Test (1) Activation

With the use of the batteries A to F of respective examples and the battery X of the comparative example fabricated as above, activation of the batteries is executed by repeating ten times such a charge/discharge cycle that the batteries are charged by a current value of 650 mA for sixteen hours at a room temperature (about 25° C.), then ceased for one hour, and then discharged by a current value of 1300 mA until the battery voltage becomes 0.8 V.

(2) V-I Characteristic Test

Then, with the use of the batteries A to F of respective examples and the battery X of the comparative example which are activated as above, the batteries which have been discharged by the current value of 1300 mA at the room temperature (about 25° C.) until the battery voltage is reduced to 0.8 V are charged by the current value of 1300 mA for three hours. Then, after the batteries are ceased for one hour and then discharged by a current value of 25 A for 30 seconds, the battery voltage is measured after 10 seconds.

Then, after a power equivalent to a discharged power is charged, the batteries are similarly discharged by current values of 50A, 70A, 100A for 30 seconds respectively. Then, the battery voltage is measured after 10 second respectively. When V-I straights (V-I characteristics) are detected by using the battery voltage, derived as above after 10 seconds have been lapsed, as an ordinate and the current values as an abscissa, results shown in FIG. 16 are obtained.

Figure 16:
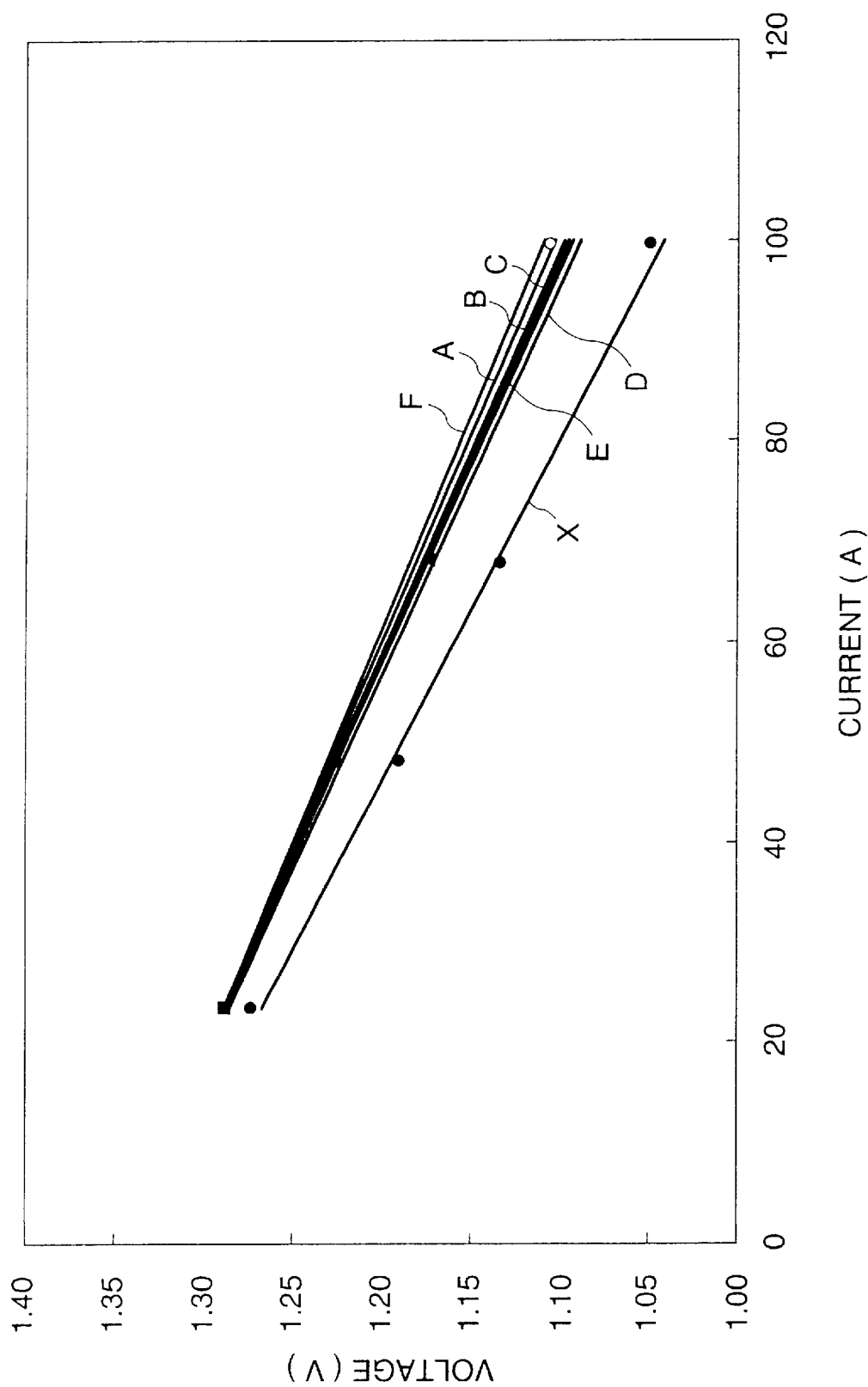
FIG. 16 is a view showing the voltage (V)-current (I) characteristics of respective batteries.

As apparent from FIG. 16, it can be understood that the V-I straight of the battery X in the comparative example has a large gradient whereas the V-I straights of the batteries A to F in respective embodiments have a small gradient. It can be understood based on this that all operation voltages of the batteries A to F in respective embodiments are high and battery internal resistances are low. The reasons for this may be considered such that, since heights of the cylindrical bodies 20, 30, 40, 50, 60, 70 acting as the lead portion are low in the batteries A to F in respective embodiments and thus the current collecting distance from the welded portion on the bottom surface of the port-sealing body 17 to the welded portion on the upper surface of the positive electrode current collecting body 14 is short, the inner resistance in the lead portion can be reduced and thus the high output characteristic can be obtained.

Also, since the current route in supplying the current is divided into two routes along the peripheral side wall of the cylindrical body 20, 30, 40, 50, 60, or 70, such current route becomes equal to the half of the entire peripheral side wall of the cylindrical body 20, 30, 40, 50, 60, or 70. Thus, since the voltage drop in the lead portion can be reduced by half, the operation voltage can also be increased.

4. Variation

In the above embodiments, the examples are explained in which the semi-complete batteries are constructed by welding the cylindrical body 20, 30,40,50, 60, 70 and the port-sealing 17 and then caulking the edge 16b of the opening of the battery case 16 inwardly to seal the port and then the batteries A to F are fabricated by pressurizing the port-sealing portion of the port-sealing 17 by means of the punch P to push the port-sealing 17 into the battery case 16. However, since the present invention can be fabricated by other method, other fabricating method will be explained as a variation with reference to FIG. 17 and FIG. 18 hereunder. In this case, an example in which the battery is fabricated by using the cylindrical body 20 will be explained hereinafter, but it is true of other cylindrical bodies 30, 40, 50, 60, 70.

First, the above electrode body 10 is installed into the battery case 16 which is formed of nickel-plated iron to form the cylinder with a bottom, then the not-shown welding electrode is inserted in the space portion 10a formed at the center portion of the electrode body 10, and then the negative electrode current collecting body 15 being welded to the hydrogen-storing alloy negative electrode plate 12 is spot-welded to the inner bottom surface of the battery case 16. Then, the main body portion 21 of the above cylindrical body 20 is loaded on the positive electrode current collecting body 14 such that the main body portion 21 is positioned on the diameter of the positive electrode current collecting body 14, and both blade portions 22, 22 are loaded on the positive electrode current collecting body 14. Then, both blade portions 22, 22 and the positive electrode current collecting body 14 are welded by the spot welding (first welding).

In this manner, after both blade portions 22, 22 of the cylindrical body 20 and the positive electrode current collecting body 14 are welded, the vibrating isolating ring 18 is inserted into the upper inner peripheral side of the battery case 16, and then the annular groove 16a is formed at the upper end portion of the vibrating isolating ring 18 by applying the grooving work to the outer peripheral side of the battery case 16. Then, the electrolytic solution formed of the 30 mass %.potassium hydroxide (KOH) solution is injected into the battery case 16, and then the port-sealing body 17, on the periphery of which the insulation gasket 19 is fitted, is arranged on the upper portion of the opening portions of the battery case 16. In this case, the bottom surface of the port-sealing body 17 comes into contact with the peripheral side surface of the main body portion 21 of the cylindrical body 20.

Figure 17:
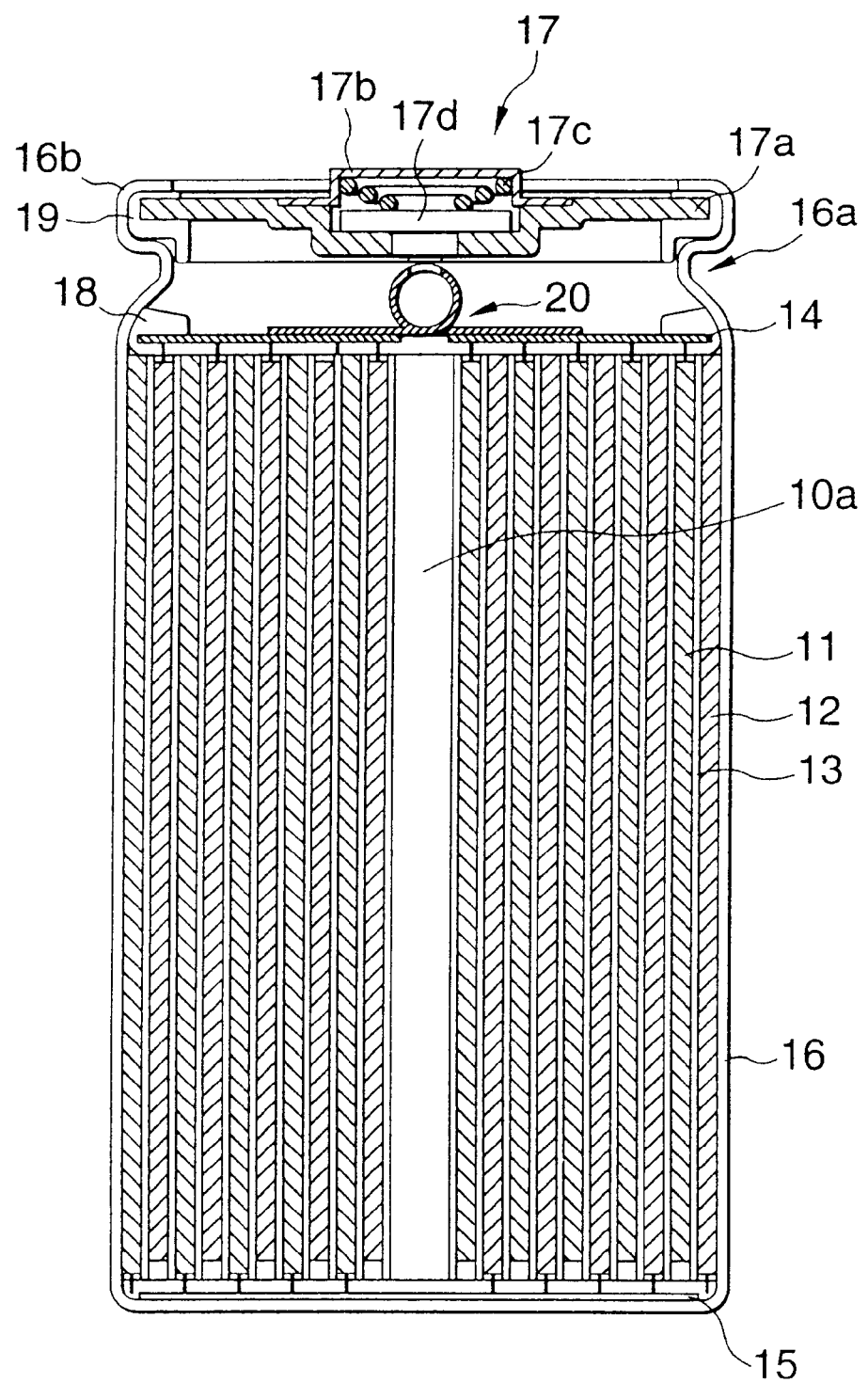
FIG. 17 is a sectional view of a variation showing the port-sealing body sealed onto the opening portion of the battery case.
Figure 18:
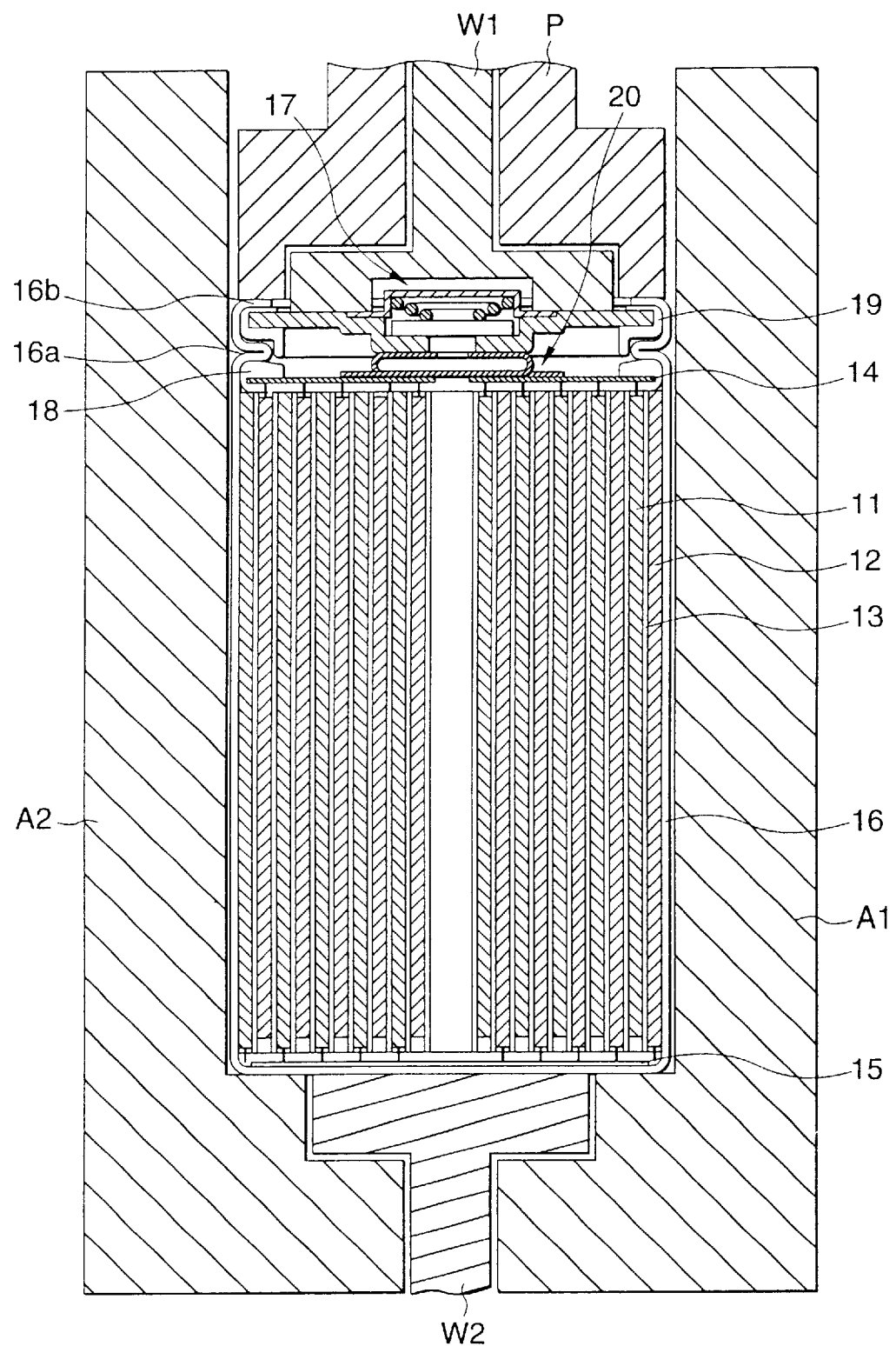
FIG. 18 is a sectional view showing the state that the cylindrical body constituting the lead portion in FIG. 1 is welded to the port-sealing body and the state that the port-sealing portion is pressed.

Then, the port of the battery is sealed by caulking the edge 16b of the opening of the battery case 16 inwardly, whereby a semi-complete battery is formed, as shown in FIG. 17. Then, after the port of the battery is sealed as mentioned above, as shown in FIG. 18, one welding electrode W1 is arranged on the upper surface of the positive electrode cap (positive electrode external terminal) 17b while the other welding electrode W2 is arranged on the lower surface of the bottom surface (negative electrode external terminal) of the battery case 16. Then, this semi-complete battery and a pair of welding electrodes W1, W2 are arranged in a pair of split moulds A1, A2, and then the punch P connected to the press machine is arranged on the port-sealing body 17.

Then, while pressurizing the port-sealing portion (the opening edge 16b of the battery case 16) of the port-sealing body 17 by the punch P and also applying the pressure of $2 \times 10^6$ N/m² between a pair of these welding electrodes W1, W2 by pushing down the punch P by driving the press machine, the current supplying process (second welding) is applied by applying the voltage of 24 V between these welding electrodes W1, W2 in the discharge direction of the battery to flow the current of 3 KA for a time of about 15 msec. Accordingly, the port-sealing body 17 can be pushed into the battery case 16 and the contact portion between the bottom surface of the port-sealing body 17 and the peripheral side surface of the main body portion 21 of the cylindrical portion 20 is welded by the current supplying process to form the welded portion.

Since the current supplying process is applied by applying the voltage while pressurizing the port-sealing portion of the port-sealing body 17 (opening edge 16b of the battery case 16) by the punch P and applying a pressure of $2 \times 10^6$ N/m² between a pair of welding electrodes W1, W2, it is possible to form the good contact spot between the peripheral side surface of the main body portion 21 of the cylindrical body 20 and the bottom surface of the port-sealing body 17 even if the height dimension of the electrode body 10 is varied or the welding position of the cylindrical body 20 welded to the positive electrode current collecting body 14 is varied. As a result, not only the generation of "weld dust" acting as a cause to generate the internal short-circuit can be suppressed without fail, but also. the welded portion that has no internal defect and has the excellent weld strength can be formed.

Then, the annular groove 16a is crushed by pressurizing the port-sealing portion of the port-sealing body 17 by means of the punch P, and then the lower end of the insulation gasket 19 can drop down close to the upper end portion of the vibration isolating ring 18. Therefore, as shown in FIG. 5, the cylindrical nickel-hydrogen storage battery having the nominal capacity of 6.5 Ah is fabricated. The main body portion 21 of the cylindrical body 20 is crushed by the pressurizing force generated by the punch P along a pair of notched portions 23, 23 formed on both edges along the axial direction, whereby the sectional shape becomes an elliptic shape that is formed by crushing the circle. The nickel-hydrogen storage battery fabricated in this way becomes a battery that has the high operation voltage and the low internal resistance.

In the above embodiment 6, the example in which four projection portions 74 are provided on the peripheral side surface of the cylindrical body 70 is explained. In this case, any number of the projection portions may be selected. In other words, at least one projection portion comes into contact with the bottom surface of the port-sealing body 17 or the upper surface of the positive electrode current collecting body 14 so as to concentrate the welding current therein, and thus the welded portion can be formed. However, since the welding current is spread and the predetermined weld strength cannot be obtained if the number of the projection portions is too large or the current collecting property is lowered if the number of the projection portions is too small, it is preferable that the number of the projection portions should be set to about four. Also, the projection portions may be provided on the bottom surface of the port-sealing body 17 or the upper surface of the positive electrode current collecting body 14 in place of the peripheral side surface of the cylindrical body 70. Accordingly, since the current can be concentrated into the projection portions, the welded portion having the larger weld strength can be formed.

Also, in the above embodiments and the variation, before the current is supplied between the positive electrode external terminal (positive electrode cap) 17a and the negative electrode external terminal (bottom surface of the battery case 16), respective cylindrical bodies 20, 30, 40, 50, 60, 70 are welded to the positive electrode current collecting body 14 and then respective cylindrical bodies 20, 30, 40, 50, 60, 70 and the port-sealing body 17 are welded together. In contrast, if the positive electrode current collecting body 14 and respective cylindrical bodies 20, 30, 40, 50, 60, 70 are welded by supplying the current between the positive electrode external terminal (positive electrode cap) 17a and the negative electrode external terminal (bottom surface of the battery case 16) after respective cylindrical bodies 20, 30, 40, 50, 60, 70 and the port-sealing body 17 are welded, similar results can be obtained.

Also, in the above embodiments and the variation, after the negative electrode current collecting body 15 and the inner bottom surface of the battery case 16 are welded, respective cylindrical bodies 20, 30, 40, 50, 60, 70 and the port-sealing body 17 are welded by supplying the current between the positive electrode external terminal (positive electrode cap) 17a and the negative electrode external terminal (bottom surface of the battery case 16). In contrast, the welding of the negative electrode current collecting body 15 and the inner bottom surface of the battery case 16 may be performed simultaneously at the time of this welding. In this case, the welding of respective cylindrical bodies 20, 30, 40, 50, 60, 70 and the positive electrode current collecting body 14 may be performed before the electrode body 10 is inserted into the battery case 16 but after the electrode body 10 is constructed.

Also, in the above embodiments and the variation, the welding is performed by applying the voltage of 24 V between the positive electrode cap (positive electrode external terminal) 17a and the bottom surface of the battery case 16 (negative electrode external terminal) in the discharge direction of the battery to flow the current of 3 KA for about 15 msec. In this case, there is no correlation as for the direction of the current supplied to the battery, and the similar results can be obtained in both the discharging direction of the battery and the charging direction. Also, the supplied current value is not relevant to the size of the battery, and similar advantages can be achieved by using the current of 300 A or more. In addition, as the power supply of the welding current supplied between the battery case and the port-sealing body in the welding step, the DC or AC power supply may be employed.

However, if the excessively large current is supplied, respective cylindrical bodies 20, 30, 40, 50, 60, 70 are melted down even when such current is supplied for a short-time. The upper limit value of such melting-down current is changed depending upon the material and the shape of respective cylindrical bodies 20, 30, 40, 50, 60, and 70. Therefore, the current value must be set to more than 300 A, but it must be set to a value not to melt down respective cylindrical bodies 20, 30, 40, 50, 60, 70. In addition, if the supply time is in excess of 0.25 msec, the similar advantages can be achieved. However, it is not preferable to supply the current for a long time such as one second because respective cylindrical bodies 20, 30, 40, 50, 60, 70 are melted down.

In addition, in the above embodiments and the variation, the example is explained in which the port-sealing body is used as the positive electrode terminal and the battery case is used as the negative electrode terminal. In contrast, the port-sealing body may be used as the negative electrode terminal and the battery case may be used as the positive electrode terminal. In this case, the positive electrode current collecting body is welded to the inner bottom surface of the battery case, whereas the bottom surface of the port-sealing body is welded to the negative electrode current collecting body via respective cylindrical bodies 20, 30, 40, 50, 60, 70.

Furthermore, in the above embodiments and the variation, the example is explained in which the present invention is applied to the nickel-hydrogen storage battery. In contrast, the present invention is not limited to the nickel-hydrogen storage battery, but it is apparent that the present invention may be applied to other storage batteries such as the nickel-cadmium storage battery, etc.

What is claimed is:

1. A storage battery comprising:
    a battery case used as a first polarity terminal and having an opening;
    a port-sealing body used as a second polarity terminal, for sealing the opening; and
    an electrode body installed into the battery case and having a current collecting body connected to at least one of end portions of positive and negative electrodes;
    wherein the port-sealing body and the current collecting body are welded to a part of a peripheral side surface of a lead portion comprising a cylindrical body having a hollow portion, and wherein at least one of both edges of the cylindrical body is cut off obliquely, a peripheral side surface which is a shortest side by this cutting is welded to the port-sealing body or the current collecting body, and a peripheral side surface which is a longest side is welded to the current collecting body or the port-sealing body.

2. A storage battery according to claim 1, wherein the lead portion is bonded to the port-sealing body and the current collecting body by welding while pressurizing the battery case and port-sealing body.

3. A storage battery according to claim 1, wherein outer ends of the peripheral side surface of the lead portion are located inside outer ends of the bottom surface of the port-sealing body.

4. A storage battery according to claim 2, wherein the cylindrical body has a sectional shape which is obtained by crushing the sectional shape of a circular shape into an elliptic shape by a pressurizing force.

5. A storage battery according to claim 2, wherein the cylindrical body has a sectional shape which is obtained by crushing the sectional shape of a polygonal shape by a pressurizing force.

6. A storage battery according to claim 1, further comprising:
    notched portions provided on both edges of the cylindrical body to extend in an axial direction;
    wherein the cylindrical body is crushed along the notched portions.

7. A storage battery according to claim 1, further comprising:
    projection portions provided on a lower surface of the port-sealing body or an upper surface of the current collecting body;
    wherein the projection portions are welded to the peripheral side surface of the cylindrical body.

8. A storage battery according to claim 1, further comprising:
projection portions provided on a peripheral side surface of the lead portion formed of the cylindrical body having the hollow portion;
wherein the projection portions are welded to the upper surface of the current collecting body or the lower surface of the port-sealing body.

9. A storage battery according to claim 8, wherein four projection portions are welded to the upper surface of the current collecting body or the lower surface of the port-sealing body.

10. A storage battery comprising:
a battery case used as a first polarity terminal and having an opening;
a port-sealing body used as a second polarity terminal, for sealing the opening; and
an electrode body installed into the battery case and having a current collecting body connected to at least one of end portions of positive and negative electrodes;
wherein the port-sealing body and the current collecting body are welded to a part of a peripheral side surface of a lead portion comprising a cylindrical body having a hollow portion, and wherein the cylindrical body has flat plate blade portions extending from the peripheral side surface to both sides, the blade portions are welded to the port-sealing body or the current collecting body, and peripheral side surfaces opposite to the blade portions are welded to the current collecting body or the port-sealing body.

11. A storage battery according to claim 10, wherein the blade portions are formed by extending a part of the peripheral side wall of the cylindrical body.

12. A storage battery according to claim 10, wherein the lead portion is bonded to the port-sealing body and the current collecting body by welding while pressurizing the battery case and the port-sealing body.

13. A storage battery according to claim 10, wherein outer ends of the peripheral side surface of the lead portion are located inside outer ends of the bottom surface of the port-sealing body.

14. A storage battery according to claim 12, wherein the cylindrical body has a sectional shape which is obtained by crushing the sectional shape of a circular shape into an elliptic shape by a pressurizing force.

15. A storage battery according to claim 12, wherein the cylindrical body has a sectional shape which is obtained by crushing the sectional shape of a polygonal shape by a pressurizing force.

16. A storage battery according to claim 10, further comprising:
notched portions provided on both edges of the cylindrical body to extend in an axial direction;
wherein the cylindrical body is crushed along the notched portions.

17. A storage battery according to claim 10, further comprising:
projection portions provided on a lower surface of the port-sealing body or an upper surface of the current collecting body;
wherein the projection portions are welded to the peripheral side surface of the cylindrical body.

18. A storage battery according to claim 10, further comprising:
projection portions provided on a peripheral side surface of the lead portion formed of the cylindrical body having the hollow portion;
wherein the projection portions are welded to the upper surface of the current collecting body or the lower surface of the port-sealing body.

19. A storage battery according to claim 18, wherein four projection portions are welded to the upper surface of the current collecting body or the lower surface of the port-sealing body.

20. A method of fabricating a storage battery comprising the steps of:
installing an electrode body in which a current collecting body is connected to at least one of end portions of positive and negative electrodes into a battery case;
supplying an electrolyte into the battery case;
arranging a port-sealing body used as a first polarity terminal in an opening portion of the battery case which is used as a second polarity terminal such that the current collecting body is brought into contact with the port-sealing body via a lead portion that connects electrically the current collecting body and the port-sealing body;
welding the lead portion to any one of the port-sealing body and the current collecting body by flowing a current between the battery case and the port-sealing body while pressurizing the battery case and the port-sealing body; and
sealing tightly the opening portion by the port-sealing body.

21. A method of fabricating a storage battery according to claim 20, wherein the current is so large as to generate a current flow caused by an electrolysis of the electrolyte solution in the storage battery.

22. A method of fabricating a storage battery according to claim 21, further comprising a step of pre-welding the lead portion into an upper surface of the current collecting body, prior to the arranging step.

23. A method of fabricating a storage battery according to claim 21, further comprising a step of pre-welding the lead portion into a lower surface of the port-sealing body, prior to the arranging step.

24. A method of fabricating a storage battery according to claim 21, wherein said arranging step comprising the steps of:
a first arranging step of arranging a lead portion, which connects electrically the current collecting body and the port-sealing body, on an upper surface of the current collecting body; and
a second arranging step of arranging the port-sealing body into the opening portion of the battery case; wherein
said welding step comprises a welding step of welding the lead portion to a lower surface of the port-sealing body and an upper surface of the current collecting body simultaneously by supplying a current between the battery case and the port-sealing body.

25. A method of fabricating a storage battery according to claim 20, further comprising a step of sealing the opening portion of the battery case tightly with the port-sealing body after the welding step.

26. A method of fabricating a storage battery according to claim 20, further comprising the step of sealing the opening portion of the battery case tightly with the port-sealing body to form a sealing portion prior to the welding step, wherein the welding step is performed after the sealing step, by pressurizing the lead portion between the port-sealing body and the current collecting body while crushing an annular groove formed over the battery case and by supplying the current between the battery case and the port-sealing body after a port-sealing portion is formed around the port-sealing body by sealing tightly the opening portion of the battery case.

27. A method of fabricating a storage battery according to claim 20, wherein a lower current collecting body is welded to an inner bottom surface of the battery case simultaneously with the welding step.

28. A method of fabricating a storage battery according to claim 20, wherein the lead portion is formed of a cylindrical body having a hollow portion, and the cylindrical body has a sectional shape of a circular shape formed into an elliptic shape by crushing with a pressurizing force after the port-sealing body is sealed.

29. A method of fabricating a storage battery according to claim 20, wherein the lead portion is formed of a cylindrical body having a hollow portion, and the cylindrical body has a sectional shape of a polygonal shape, and the sectional shape is crushed by a pressurizing force after the port-sealing body is sealed.

30. A method of fabricating a storage battery according to claim 20, wherein the lead portion is formed of a cylindrical body having a hollow portion, and the cylindrical body has a sectional shape of a polygonal shape whose edge portion is located at upper end or lower end, and the sectional shape is crushed by a pressurizing force after the port-sealing body is sealed.

31. A method of fabricating a storage battery according to claim 20, wherein notched portions are provided on both edges of the cylindrical body to extend in an axial direction; and the sectional shape is crushed along the notched portions.

32. A method of fabricating a storage battery according to claim 31, wherein projection portions are formed on a lower surface of the port-sealing body, an upper surface of the current collecting body, or a peripheral side surface of the lead portion, and a welding current during the welding step is concentrated into the projection portions.

33. A method of fabricating a storage battery according to claim 20, wherein the lead portion has a cylindrical body having a hollow portion, and flat plate blade portions extending from the peripheral side surface to both sides, and the blade portions are previously welded to the current collecting body or the port-sealing body in the welding step.

34. A method of fabricating a storage battery according to claim 33, wherein the blade portions are formed by extending a part of the peripheral side wall of the cylindrical body.

35. A method of fabricating a storage battery according to claim 27, wherein projection portions are formed on a lower surface of the electrode body, or inner surface of the battery case, and a welding current during the welding step is concentrated into the projection portions.

* * * * *